United States Patent [19]
Baum et al.

[11] Patent Number: 5,600,506
[45] Date of Patent: Feb. 4, 1997

[54] APPARATUS AND METHOD FOR DETERMINING THE POSITION OF A TRANSDUCER RELATIVE TO A DISK SURFACE IN A DISK DRIVE SYSTEM

[75] Inventors: Michael Baum, Longmont; James Touchton, Boulder, both of Colo.

[73] Assignee: Conner Peripherals, Inc., San Jose, Calif.

[21] Appl. No.: 435,435

[22] Filed: May 10, 1995

[51] Int. Cl.⁶ .................................................. G11B 5/596
[52] U.S. Cl. ..................... 360/78.14; 360/48; 360/77.08
[58] Field of Search ............................. 360/78.04, 78.14, 360/48, 77.08, 77.02, 77.05

[56] References Cited

U.S. PATENT DOCUMENTS

| | | |
|---|---|---|
| 4,488,188 | 12/1984 | Hansen et al. . |
| 4,549,232 | 10/1985 | Axmear et al. . |
| 4,669,004 | 5/1987 | Moon et al. . |
| 5,146,374 | 9/1992 | Sakurai ............................ 360/78.14 |
| 5,245,594 | 9/1993 | Shimuzu ....................... 360/77.08 X |
| 5,262,907 | 11/1993 | Duffy et al. .................. 360/78.14 X |
| 5,274,509 | 12/1993 | Buch ................................... 360/48 |
| 5,274,510 | 12/1993 | Sugita et al. .................. 360/78.14 X |
| 5,369,535 | 11/1994 | Hetzler .............................. 360/78.14 |
| 5,396,380 | 3/1995 | Shimizu et al. .................. 360/78.14 |
| 5,400,201 | 3/1995 | Pederson ..................... 360/78.14 X |
| 5,434,725 | 7/1995 | Hirose et al. ................. 360/78.04 X |

*Primary Examiner*—Aristotelis M. Psitos
*Assistant Examiner*—James L. Habermehl
*Attorney, Agent, or Firm*—Fliesler, Dubb, Meyer & Lovejoy

[57] ABSTRACT

A method and system for generating a position signal indicative of the position of a transducer with reference to a fixed reference point on the surface of a disk within a disk drive system. The system is comprised of two major elements. The first element is a disk divided into sectors and has Z data tracks where each sector includes a preamble area that includes a servo band comprised of 0.75*Z consecutive overlapping quadrature servo patterns and gray scale band comprised of 1.5*Z consecutively addressed gray scale areas that have been recorded across all data tracks. The second element is a position generator that generates the position signal from the relative magnitude of each of the four servo bursts of a quadrature servo pattern of the servo band and the gray scale address of the gray scale area of the gray scale band that is read by a transducer when the transducer reads the preamble of a sector.

48 Claims, 11 Drawing Sheets

5,600,506

APPARATUS AND METHOD FOR DETERMINING THE POSITION OF A TRANSDUCER RELATIVE TO A DISK SURFACE IN A DISK DRIVE SYSTEM

CROSS REFERENCE TO RELATED APPLICATION

The present application and the following application are assigned to the Assignee of the present application:

DISK DRIVE SYSTEM USING MULTIPLE EMBEDDED Quadrature SERVO FIELDS, invented by Louis J. Shrinkle, et al, application Ser. No. 386,504, filed Jul. 27, 1989.

The above cross referenced application is hereby incorporated by reference as if the above cross referenced application was fully set forth herein.

BACKGROUND OF THE INVENTION

The present invention is related to a method and apparatus for determining the position of a transducer with reference to the surface of a disk in a disk drive system. More specifically the method and apparatus incorporate the use of embedded servo patterns and gray scales permanently recorded on the surface of the disk.

Positioning systems within disk drive systems have been used to control the positioning of a transducer to a desired track on a disk surface during a seek operation and for maintaining the position of the transducer at the center of an addressed track during a track following operation. One type of positioning system employs sectors where each sector includes an embedded servo band and a gray scale band in the preamble of the sector. The servo band may take the form of a sequence of overlapping quadrature servo patterns. Each quadrature servo pattern consists of four servo bursts where each of the servo bursts is offset from each of the other servo bursts. Some quadrature servo patterns will span more than one data track and therefore will overlap the immediately preceding and following quadrature servo pattern in the servo band such that each track contains some portion of each of the four servo bursts from one or more quadrature servo pattern. The magnitude of each of the four servo bursts is determined during the reading of the preamble of each sector and a position error signal is generated therefrom indicating the displacement of the transducer from the center of the addressed track being read by the transducer. The position error signal is then used as part of a closed looped servo system to correct the positions of the transducer such that the transducer's position will track the center of the addressed data track. The position error signal has also been used to count track crossing during a seek operation.

The gray code band is comprised of a plurality of gray code areas that again extends across data tracks. Each gray code area is associated with a data track and contains the track addressed of the associated data track. The track position of the transducer is obtained by reading the gray code address during the reading of the preamble of each sector.

A disadvantage in the use of only the quadrature servo pattern read from the servo band during a track following operation is that the track following operation is not available over the entire width of the data track.

SUMMARY OF THE INVENTION

Briefly, the positioning system of the invention present invention establishes the position of the transducer from a fixed reference point in a gray scale band located in the preamble area of each sector. The servo band is comprised of a quadrature servo pattern that is repeated 0.75*Z times across all the data tracks where Z is the number of data tracks. The gray scale band is comprised of 1.5*Z gray scale areas that are recorded across all data tracks. Each gray scale area contains a gray scale address having an integer value and the gray scale areas are sequential numbered starting with 0. A position generator generates a position signal for the transducer as a function of the relative magnitudes of the read four servo bursts, the gray scale address and whether the read gray scale address was odd or even. The position system uses as a unit of measure the width of a gray scale area and measures the position of the transducer in term of the number of gray scale areas from the center of gray scale area addressed zero. The measured position value will have an integer and fraction portion. Each data track will have a boundary defined by two servo bursts located at ⅙*W, ½*W and ⅚*W positions in a data track where W is the width of the data track. Three boundaries are used to increase the accuracy of the position value determined for the transducer.

An advantage of the present invention is that the portion of position value derived from two servo bursts is obtained from the most reliable position information derived from the four servo bursts.

Another advantage of the present invention is that the position signal may be used during a track following operation such that the track following operation may be used over the entire width of a data track.

Finally, an advantage of the present invention is that the center of the addressed data track during a seek operation can be expressed in gray scale units such that the position value for the transducer may be used to control the velocity profile of the actuator during a seek operation and the seek operation will place the transducer close to the center of the addressed track thereby reducing the settling time of the transducer following a seek operation.

BRIEF DESCRIPTION OF THE DRAWINGS

The invention will be described with respect to the particular embodiments thereof and reference will be made to the drawings, where a reference numeral refers to the same element through out the drawings, in which.

DETAILED DESCRIPTION OF THE INVENTION

The present invention is the method and apparatus for generating a position signal indicative of the location of a transducer with reference to the surface of a disk within a disk drive system.

The apparatus is comprised of two major elements, a properly encoded sector magnetic disk and a position generator. The disk is divided into sectors. Each sector has a preamble area that includes a servo band and gray scale band recorded across all data tracks. It is understood that each data surface of each disk in the disk drive system is a first element. The second element is a position generator that generates a position signal from a quadrature servo pattern of the servo band and a gray scale address read by a transducer when the transducer reads the preamble of a sector.

Figure 1:
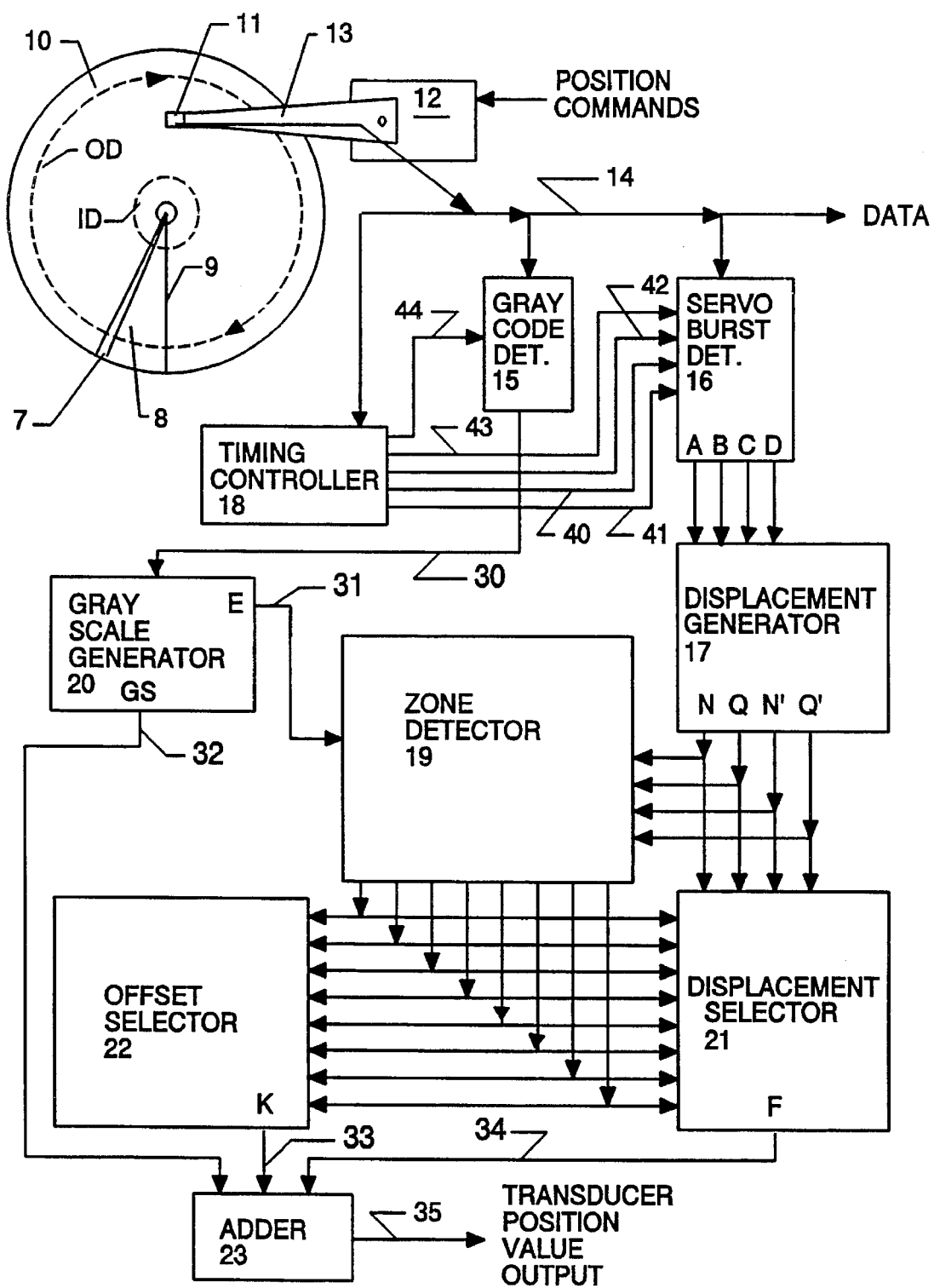
FIG. 1 is a block diagram of a disk drive system employing hardware to generate the position signal of the present invention.

Referring to FIG. 1, the first element is shown as a disk 10 of the disk drive system that is divided into sectors 9 where each sector 9 is divided into a preamble area 7 and a data area 8. In each sector 9, data is recorded in the data area 8 on data tracks located between an outer diameter OD and an inner diameter ID on the surface of disk 10. The number of data tracks between the outer diameter OD and the inner diameter ID is represented by Z. Within the preamble area 7 of each sector 9 there is permanently recorded a servo band in the form of sequential overlapping quadrature servo patterns extending from the outer diameter OD to the inner diameter ID on the surface of disk 10 so as to transverse all the data tracks located between the outer diameter OD and the inner diameter ID on the surface of disk 10. There is further permanently recorded in preamble area 7 a gray scale band of consecutive gray scale areas extending from the outer diameter OD to the inner diameter ID on the surface of disk 10 so as to transverse all the data tracks located between the outer diameter OD and the inner diameter ID on the surface of disk 10.

Figure 4A:
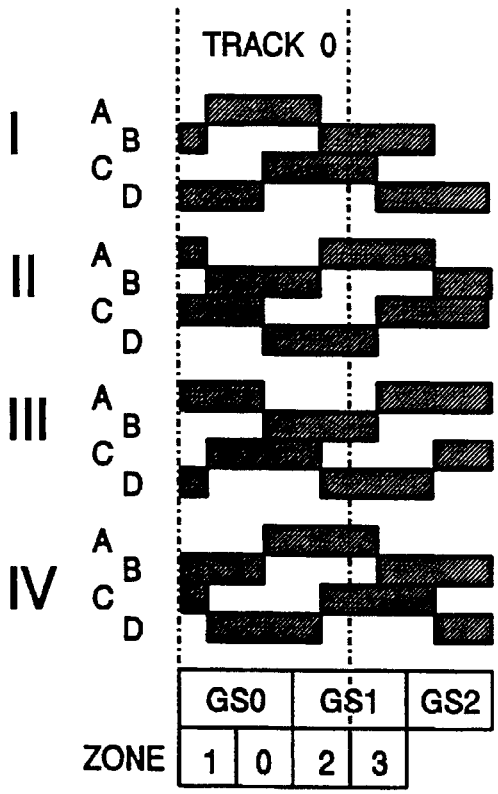
FIGS. 4(a–b) is an illustration of the eight quadrature servo patterns of the invention and the relationship between track addresses, gray scale addresses and four zones.
Figure 4B:
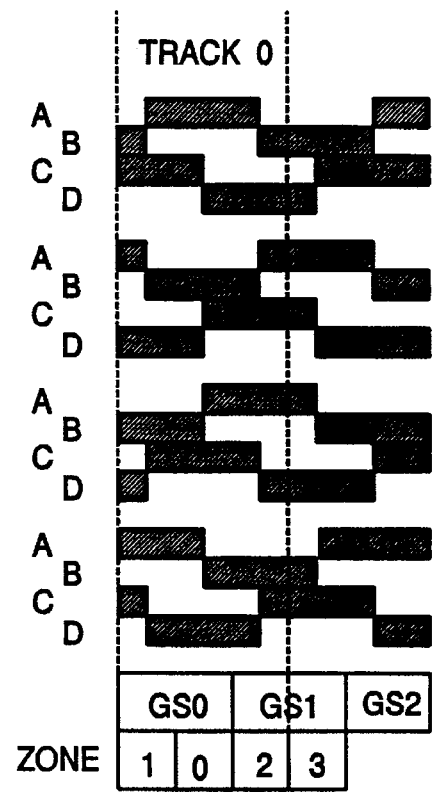

Referring to FIG. 4, eight servo patterns that can be used in the invention is shown. A first set of quadrature servo patterns is comprised of quadrature servo patterns I, II, III and IV. Each quadrature pattern in the first set is characterized by an A burst which initiates at the mid point of the D burst of the preceding quadrature servo pattern, a B burst initiating at the point of termination of the A burst, a C burst initiating at the mid point of the A burst and a D burst initiating at the point of termination of the C burst and terminating at the mid point of the A burst of the following quadrature servo pattern. A second set of quadrature servo patterns is comprised of quadrature servo patterns V, VI, VII and VIII. Each quadrature servo pattern of the second set is characterizes by an A burst which initiates at the mid point of the C burst of the preceding quadrature servo pattern, a B burst initiating at the point of termination of the A burst, a D burst initiating at the mid point of the A burst and a C burst initiating at the point of termination of the D burst and terminating at the mid point of the A burst of the following quadrature servo pattern.

The positioning measuring system is sensitive to the quadrature servo pattern used. The positioning measuring system requires that one of the four servo bursts of the quadrature servo pattern used must be centered in data track 0. Thus for the first set of quadrature servo pattern, quadrature servo pattern I has servo burst A centered in track 0, quadrature servo pattern II has servo burst B centered in track 0, quadrature servo pattern III has servo burst C centered in track 0 and quadrature servo pattern IV has servo burst D centered in track 0. In like manner, for the second set of quadrature servo pattern, quadrature servo pattern V has servo burst A centered in track 0, quadrature servo pattern VI has servo burst B centered in track 0, quadrature servo pattern VII has servo burst C centered in track 0 and quadrature servo pattern VIII has servo burst D centered in track 0. The relationship of the four servo bursts A, B, C and D for each quadrature servo pattern I, II, III, IV, V, VI, VII and VIII with the gray scale addresses GS0 AND GS1 of the gray scale band and four hypothetical zones 2, 0, 1 AND 3 associated with the gray scale addresses is shown and will be described in greater detail hereinafter.

Figure 3:
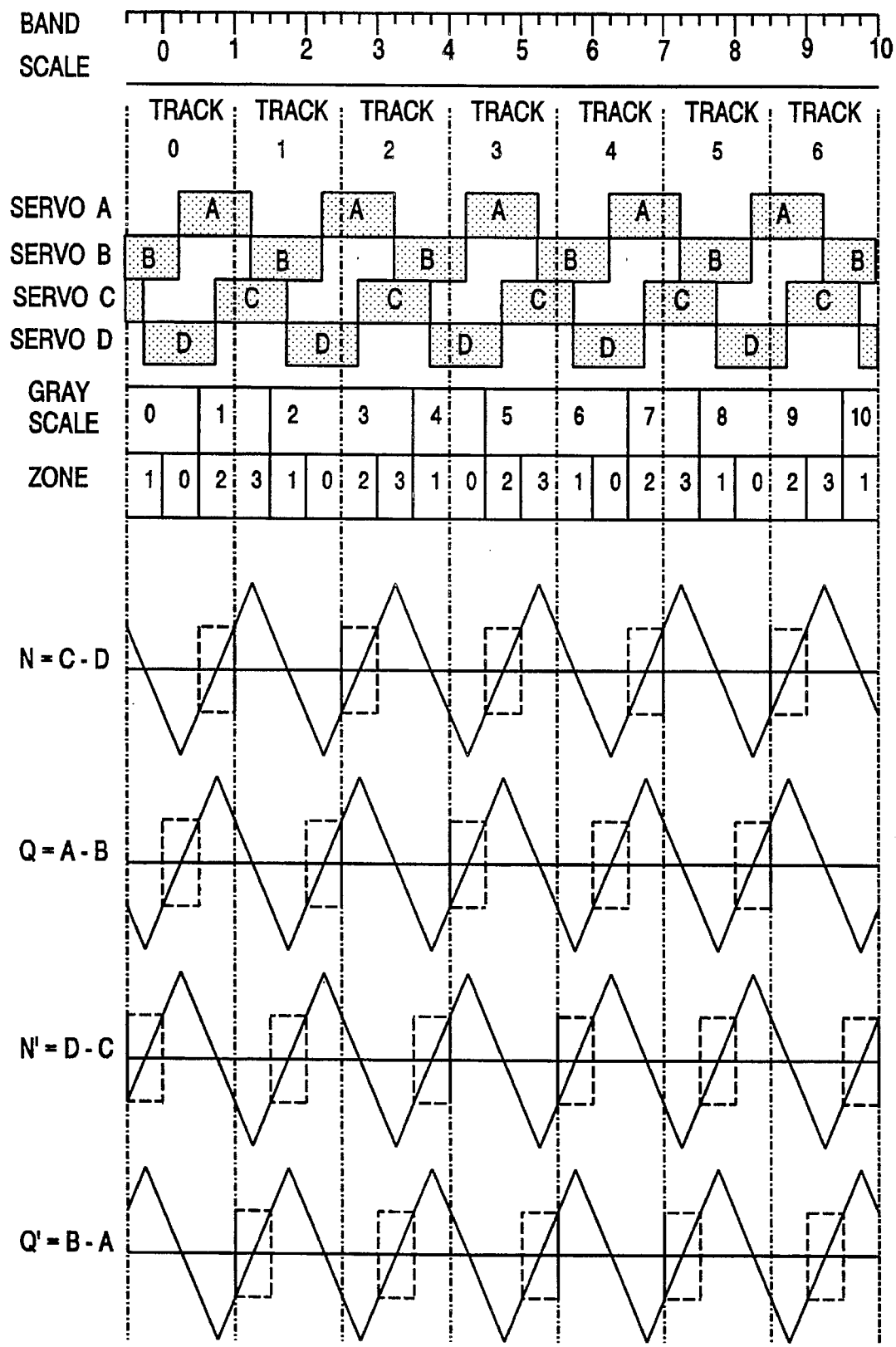
FIG. 3 is a representation of the embedded quadrature servo pattern of the servo band and the gray scale band on the disk surface, a band scale in gray scale units, two zones associated with each odd and even gray scale addresses, waveforms generated from the four servo burst and the area of the waveform used by the system for each of the zones.

Referring to FIG. 3, there is shown seven data tracks, data track addresses 0 through 6, the quadrature servo pattern IV of FIG. 4 and the gray scale band extending across those seven data tracks. Each servo burst in all quadrature servo patterns I through VIII of FIG. 4 has a width equal to ⅔*W of the width W of a data track.

As can be seen from FIG. 3, a quadrature servo pattern has an overall width of 1.5*W and is repeated three times across four data tracks 0, 1, 2 and 3. In so doing portions of the A, B, C and D bursts are distributed differently in each of the four data track. It should be noted that the distribution of the A, B, C and D burst for a given data track will be repeated every fourth data track. Therefore data track 0, 4, 8, 12, etc. will have the same distribution of the A, B, C and D burst, data tracks 1, 5, 9, 13, etc. will have the same distribution of the A, B, C and D burst, data tracks 2, 6, 10, 14, etc. will have the same distribution of the A, B, C and D burst and data tracks 3, 7, 11, 15, etc. will have the same distribution of the A, B, C and D burst.

The gray scale band comprises a plurality of sequential gray scale area where the width of each gray scale area is ⅔*W. For simplicity, the gray code areas are shown to abutted the previous and next gray scale area in the gray scale band. In practice there is a small blank area between adjacent gray scale area. Each gray scale area is defined to include the recorded gray scale address and a portion of the two blank areas bordering a gray scale area. The first gray scale is initiated at the point where track 0 is initiated on the surface of the disk and is assigned the gray scale address of 0. Each successive gray scale area is assigned in order the next integer such that the gray scale addresses are sequential numbered between the outer diameter OD and the inner diameter ID of disk 10. The assigned gray scale address is recorded in each gray scale area. It is important to note that the gray scale addresses no longer directly reflects the data track addresses as the gray code areas did in the prior art.

Therefore if the transducer read a gray scale address of 100 this does not mean that the transducer is reading information from data track 100.

The band scale of FIG. 3 is used to measure the location of the center of each data track and the location of the transducer with reference to the surface of the disk 10. The band scale uses gray scale units as a basic measuring unit where a gray scale unit has a value of ⅔*W. The band scale area has a zero point located at the center of gray scale area 0.

Any track address TA can be converted into a track position TP, expressed in gray scale units, reflecting the location of the center of the data track from the center of gray scale area 0, by the expression:

$$TP=(3/2*TA)+¼.$$

For example the track position for data track 6 would be 9.25 and the track position for data track 3 would be 4.75. This is corroborated by comparing the center of data tracks 3 and 7 and the band scale in FIG. 3.

The system employs the concept of zones where each gray scale area is divided into two zones. When two zones are referred to with respect to a gray scale area, the first mentioned zone will be the zone to the left of the center of the gray scale area and the second mentioned zone will be to the right of the center of the gray code area. An even addressed gray scale area is divided into zones 1 and 0 and an odd addressed gray scale area is divided into zones 2 and 3. The relationship between the zones and the gray scale areas is illustrated in FIGS. 3 and 4.

When two servo bursts are referred to with respect to a zone, the first mentioned servo burst will to the left of the center of the zone and the second mentioned servo burst will be to the right of the center of the zone. As can be seen from FIG. 3, the center of each zone corresponds to a boundary between two servo bursts of the quadrature servo pattern. For example in data track 4, the center of zone 1 corresponds to the boundary between bursts C and D, the center of zone 0 corresponds to the boundary between bursts B and A and the center of zone 2 corresponds to the boundary between bursts D and C. In ever data track there is a boundary between two servo burst located at ⅙*W, ½*W and ⅚*W where W is the width of a data track or when expressed as a displacement from the center of a data track the binderies are located at −⅓*W, 0 and ⅓*W locations in the data track. The location of these three boundaries for the track position TP for any track address TA can be expressed in gray scale units by the following expressions:

Left of center boundary = TP − ½;
Center boundary = TP;
Right of center boundary = TP + ½.

For example in data track 0, the left of center boundary is located at −0.25, the center boundary is located at 0.25 and the right of center boundary is located at 0.75. Further in track 5, the left of center boundary is located at 7.25, the center boundary is located at 7.75 and the right of center boundary is located at 8.25. This is corroborated by comparing the boundary of two servo bursts in tracks 0 and 5 with the band scale of FIG. 3.

The center of each gray scale area correlates with an integer value on the band scale such that by reading the gray scale address, the integer portion of a center signal is obtained. By determining the zone within the gray scale area whose gray scale address was read by the transducer the fractional portion of the center signal is obtained. The value for the center signal as a function of the zones is obtained by the following relationships:

Where the Gray Scale Area Address GS is Even, then

Even Zone 2 (EZ2) = GS + ¾;
Even Zone 0 (EZ0) = GS + ¼;
Even Zone 3 (EZ3) = GS − ¾; and
Even Zone 1 (EZ1) = GS − ¼.

Where Gray Scale Area Address GS is Odd, then

Odd Zone 2 (OZ2) = GS − ¼;
Odd Zone 0 (OZ0) = GS − ¾;
Odd Zone 3 (OZ3) = GS + ¼; and
Odd Zone 1 (OZ1) = GS + ¾.

A displacement signal having a value indicative of the displacement from the center of a zone for the transducer is obtained from the difference in the magnitude read for the two servo bursts whose boundary is centered in that zone. By adding the displacement signal to the center signal, a position signal is obtained having a value in gray scale units indicative of the position of the transducer with reference to the center of gray scale area 0.

Thus by permanently writing, in the preamble area of each sector on the surface of disk 10, the servo band in the described manner and the gray scale band in the described manner, a disk is established that provides data that uniquely identifies any radial location between the outer diameter OD and the inner diameter ID on disk 10.

As to the second element of the invention, the position generator generates for the transducer a digital position signal from the received values of the magnitude sampled from the four servo bursts and the address of the gray scale area. Referring to FIG. 1, an actuator 12 moves a head arm assembly 13 that carries transducer 11. Actuator 12 responds to position commands issued by a positioning system such as described in the above identified cross referenced application. Actuator 12 in responses to the position commands will move the transducer from a present data track to a new data track during a seek operation and will cause the transducer 11 to follow the center of a presently addressed data track during a track following operation. Seek and track following operations are generally well known and understood in the disk drive art and one such seek operation and track following operation is described in the above cross referenced application.

Transducer 11 generates a signal on line 14, hereinafter referred to as data, from the recorded magnetic states on disk 10. Timing controller 18 generates timing signals on line 44 for controlling the acquisition of the gray scale address from the data generated by transducer 11 by gray scale detector 15. Timing controller 18 also generates timing signals on lines 40, 41, 42 and 43 to servo burst detector 16 for controlling the acquisition of the magnitude of the four servo bursts A, B, C and D from the data generated by transducer 11. Timing controller 18 receives data generated by transducer 11 that is used by timing controller 18 for generating timing signals at the proper time. Timer controllers and gray scale detector are well known in the art and one such timer controller and gray scale detector is specifically described in the above cross referenced application.

Figure 6A:
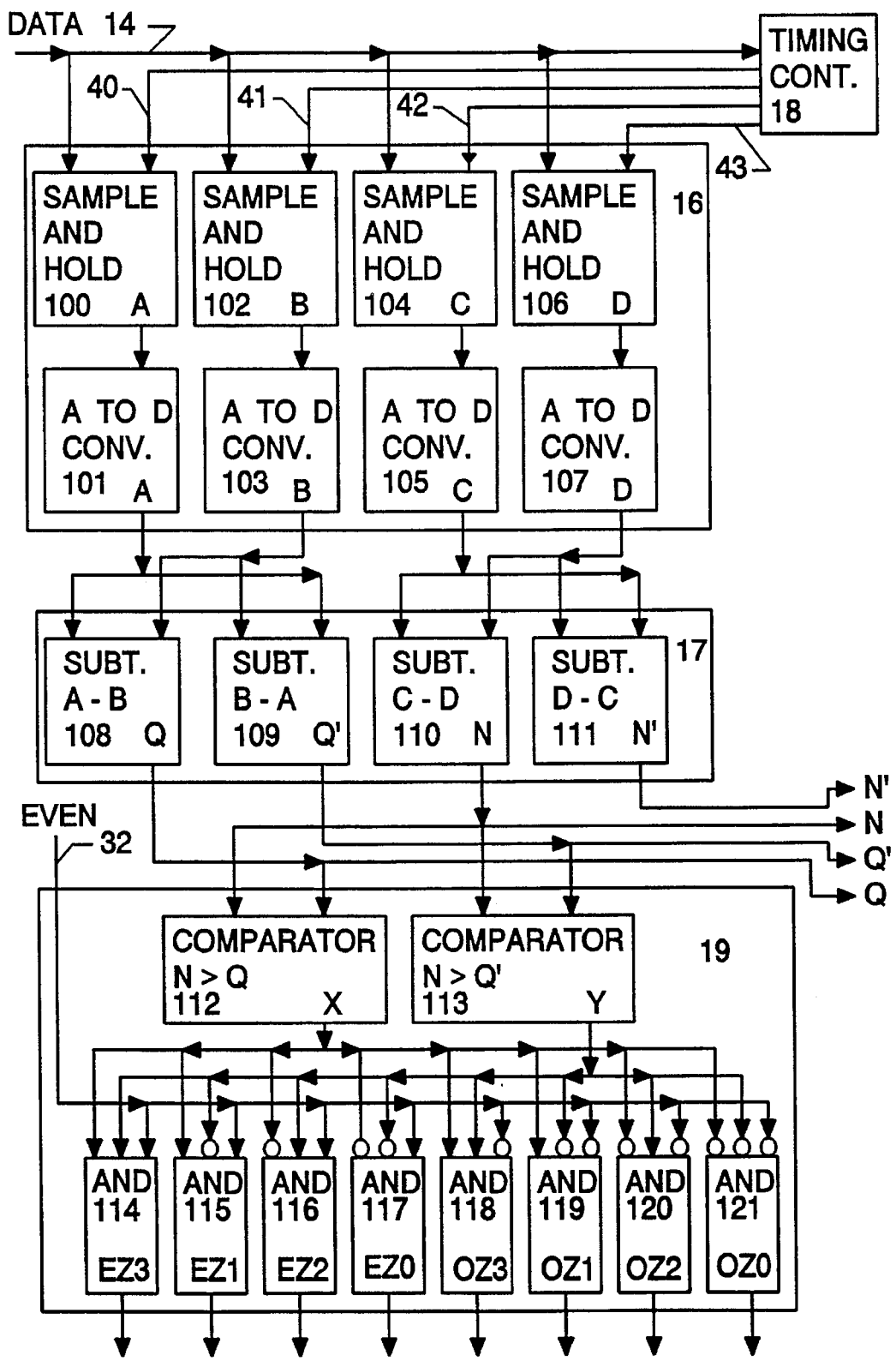
FIG. 6A is a logic diagram for the servo burst detector, the displacement generator and the zone detector of FIG. 1 where four zones are used.

Referring to FIG. 6A, a servo burst detector 16 is shown. Sample and hold circuit 100 will sample and hold the magnitude of servo burst A from the data on line 14 under the control of the control signal on line 40 from timing controller 18. A to D converter 101 converts the magnitude of the sample being held by sample and hold circuit 100 into a digital value A for servo burst A. Sample and hold circuit 102 will sample and hold the magnitude of servo burst B from the data on line 14 under the control of the control signal on line 41 from timing controller 18. A to D converter 103 converts the magnitude of the sample being held by sample and hold circuit 102 into a digital value B for servo burst B. Sample and hold circuit 104 will sample and hold the magnitude of servo burst C from the data on line 14 under the control of the control signal on line 42 from timing controller 18. A to D converter 105 converts the magnitude of the sample being held by sample and hold circuit 104 into a digital value C for servo burst C. Sample and hold circuit 106 will sample and hold the magnitude of servo burst D from the data on line 14 under the control of the control signal on line 43 from timing controller 18. A to D converter 107 converts the magnitude of the sample being held by sample and hold circuit 106 into a digital value D for servo burst D.

In many systems the gray scale address is encoded into a run length code which control the number of consecutive zeros that may exist in the encoded value for the gray scale address. Further adjacent encoded gray scale addresses are selected such that adjacent gray scale addresses will vary by only one bit. It is anticipated that the sequential gray scale addresses recorded in the gray scale areas in the gray scale band will be so encoded. Gray scale generator 20 is a decoder that decodes the encoded gray scale address captured by gray scale detector 15 into the digital integer gray scale address GS assigned to the gray scale area read by transducer 11. One decoder used in decoding gray code encode addresses into gray code track addresses employs a lookup table stored in a memory within the disk drive system that converts the encoded gray code address into the assigned gray scale area address for a gray code area. Gray scale generator 20 is anticipated to use the same approach to convert the encoded gray scale address into the gray scale address for the gray code area read by transducer 11. Gray scale generator 20 provides the digital integer gray scale address GS on line 32 and a signal E, the value of the low order bit of the gray scale area address, on line 31 that reflects whether the gray scale address is odd or even. In this embodiment, signal E will be high if the gray scale address is even and will be low when the gray scale address is odd.

The position generator generates a digital value for the position of transducer 11 from the digital values of the four digital servo burst values A, B, C and D, the digital integer gray scale address GA and whether signal E is high or low by the following procedure.

Figure 5:
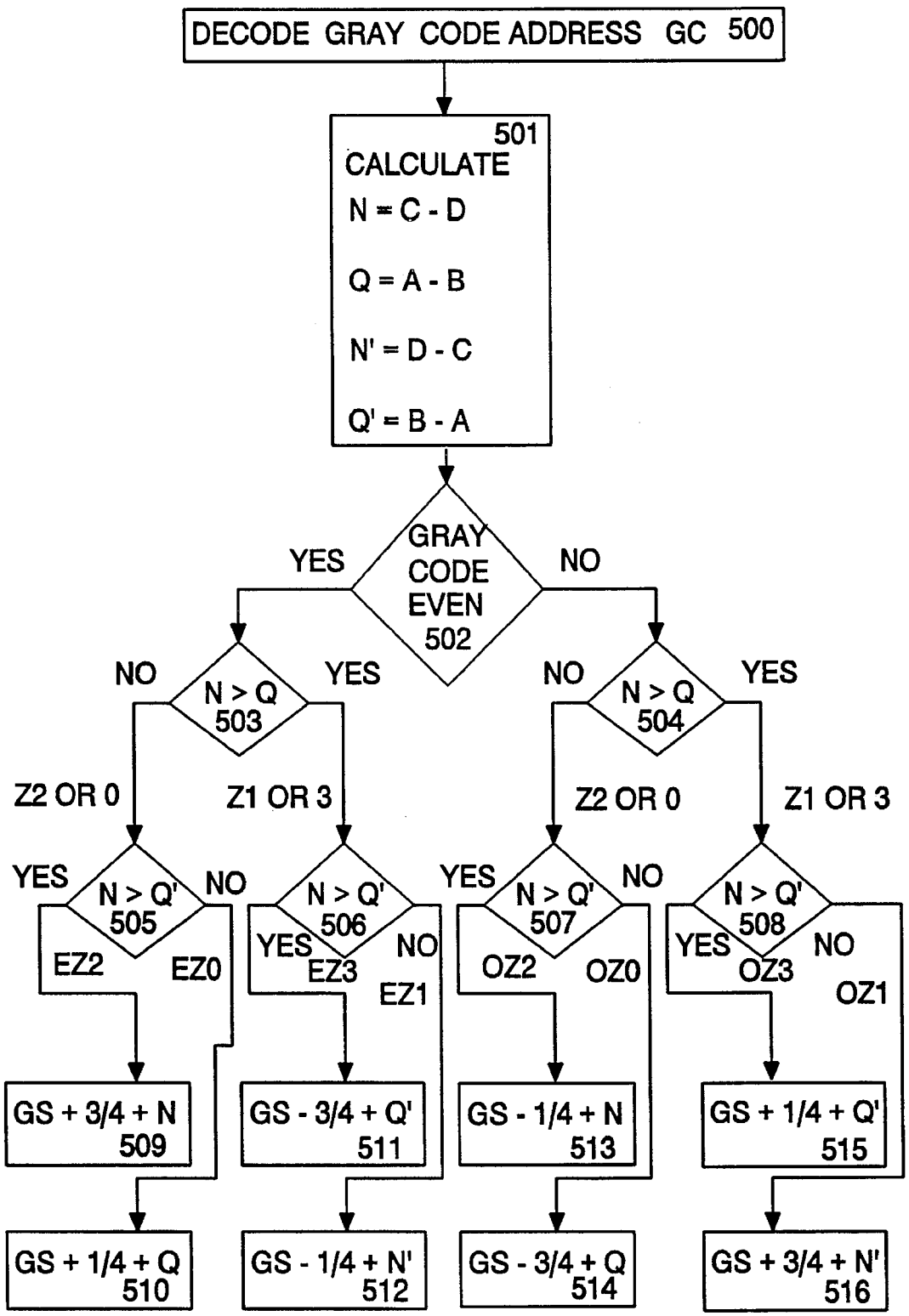
FIG. 5 is a flow chart of the method used in deriving the position signal of the invention employing four zones.

Referring to FIG. 5, there is shown a flow chart for generating the digital position value for the position signal for the location of transducer 11. Step 500 decodes the encoded gray scale address into the digital gray scale address GS for the gray scale area read by transducer 11. Step 501 generates four difference values N, Q, N' and Q' from the four digital servo bursts values A, B, C and D. The waveforms for these four difference values is shown in FIG. 3. The four difference values are generated as follows:

$$N = C - D;$$
$$Q = A - B;$$
$$N' = D - C; \text{ and}$$
$$Q' = B - A.$$

As can be seen from FIG. 3, N will have a positive slope and a zero crossing at the boundary servo burst D and C where servo burst D is to the left of the boundary and servo burst C is to the right of the boundary. The boundary between servo bursts D and C also occurs at the center of each zone 2. Therefore N will have a positive value equal to the displacement of transducer 11 to the right of the center of zone 2 and will have a negative value equal to the displacement of transducer 11 to the left of the center of zone 2.

Q will have a positive slope and a zero crossing indicating the boundary servo burst B and A where servo burst B is to the left of the boundary and servo burst A is to the right of the boundary. The boundary between servo bursts B and A also occurs at the center of each zone 0. Therefore Q will have a positive value equal to the displacement of transducer 11 to the right of the center of zone 0 and will have a negative value equal to the displacement of transducer 11 to the left of the center of zone 0.

N' will have a positive slope and a zero crossing indicating the boundary servo burst C and D where servo burst C is to the left of the boundary and servo burst D is to the right of the boundary. The boundary between servo bursts C and D also occurs at the center of each zone 1. Therefore N' will have a positive value equal to the displacement of transducer 11 to the right of the center of zone 1 and will have a negative value equal to the displacement of transducer 11 to the left of the center of zone 1.

Q' will have a positive slope and a zero crossing indicating the boundary servo burst A and B where servo burst A is to the left of the boundary and servo burst B is to the right of the boundary. The boundary between servo bursts A and B also occurs at the center of each zone 3. Therefore Q' will have a positive value equal to the displacement of transducer 11 to the right of the center of zone 3 and will have a negative value equal to the displacement of transducer 11 to the left of the center of zone 3.

The digital values of N, Q, N' and Q' represent the displacement values from the boundaries between the four servo bursts of the servo pattern. The dotted areas indicates the portion of the waveform for N, Q, N' and Q' that is used to derived the displacement values. It has been found that these dotted enclosed areas are the most linear areas that are generated thereby giving the most accurate results in generating the digital value for the position of transducer 11. This characteristic of the overall system has been found to be advantageous when a magnetoresistive transducer is used for transducer 11.

Returning to FIG. 5, the series of steps goes on to determine which zone and displacement value is to be used in generating the value for the position signal for transducer 11. To this end, step 502 determines if the address read from the gray scale area is odd or even.

If the address is even then step 503 compares the value of N with the value of Q. If N was greater than Q, then the zone will be either zone 1 or 3 and step 505 compares the value of N with the value of Q'. If N is digital value of Q' is always associated with zone 3, the value of the center signal of the even zone 3 as stated above is added to the digital value of displacement signal Q' by step 511. If N is not greater than Q', then the zone is zone 1. Since the digital value of N' is always associated with zone 1, the value of the center signal of even zone 1 as stated above is added to the digital value of displacement signal N' by step 512. If N is not greater then Q, then the zone will be either zone 2 or 0 and step 505 compares the value of N to the value of Q'. If N is greater than Q' then the zone is zone 2. Since the digital value of N is always associated with zone 2, the value of the center signal of the even zone 2 as stated above is added to the digital value of displacement signal N by step 509. If N is not greater than Q', then the zone is zone 0. Since the digital value of Q is always associated with zone 0, the value of the center signal of even zone 0 as stated above is added to the digital value of displacement signal Q by step 510.

If the address is odd then step 504 compares the value of N with the value of Q. If N is greater than Q, then the zone will be either zone 1 or 3 and step 508 compares the value of N with the value of Q'. If N is greater than Q' then the zone is zone 3. Since the digital value of Q' is always associated with zone 3, the value of the center signal of odd zone 3 as stated above is added to the digital value of displacement signal Q' by step 515. If N is not greater than Q', then the zone is zone 1. Since the digital value of N' is always associated with zone 1, the value of the center signal of odd zone 1 as stated above is added to the digital value of displacement signal N' by step 516. If N is not greater then Q, then the zone will be either zone 2 or 0 and step 507 compares the value of N to the value of Q'. If N is greater than Q' then the zone is zone 2. Since the digital value of N is always associated with zone 2, the value of the center signal of the odd zone 2 as stated above is added to the digital value of displacement signal N by step 513. If N is not greater than Q', then the zone is zone 0. Since the digital value of Q is always associated with zone 0, the value of the center signal of odd zone 0 as stated above is added to the digital value of displacement signal Q by step 514.

Figure 6B:
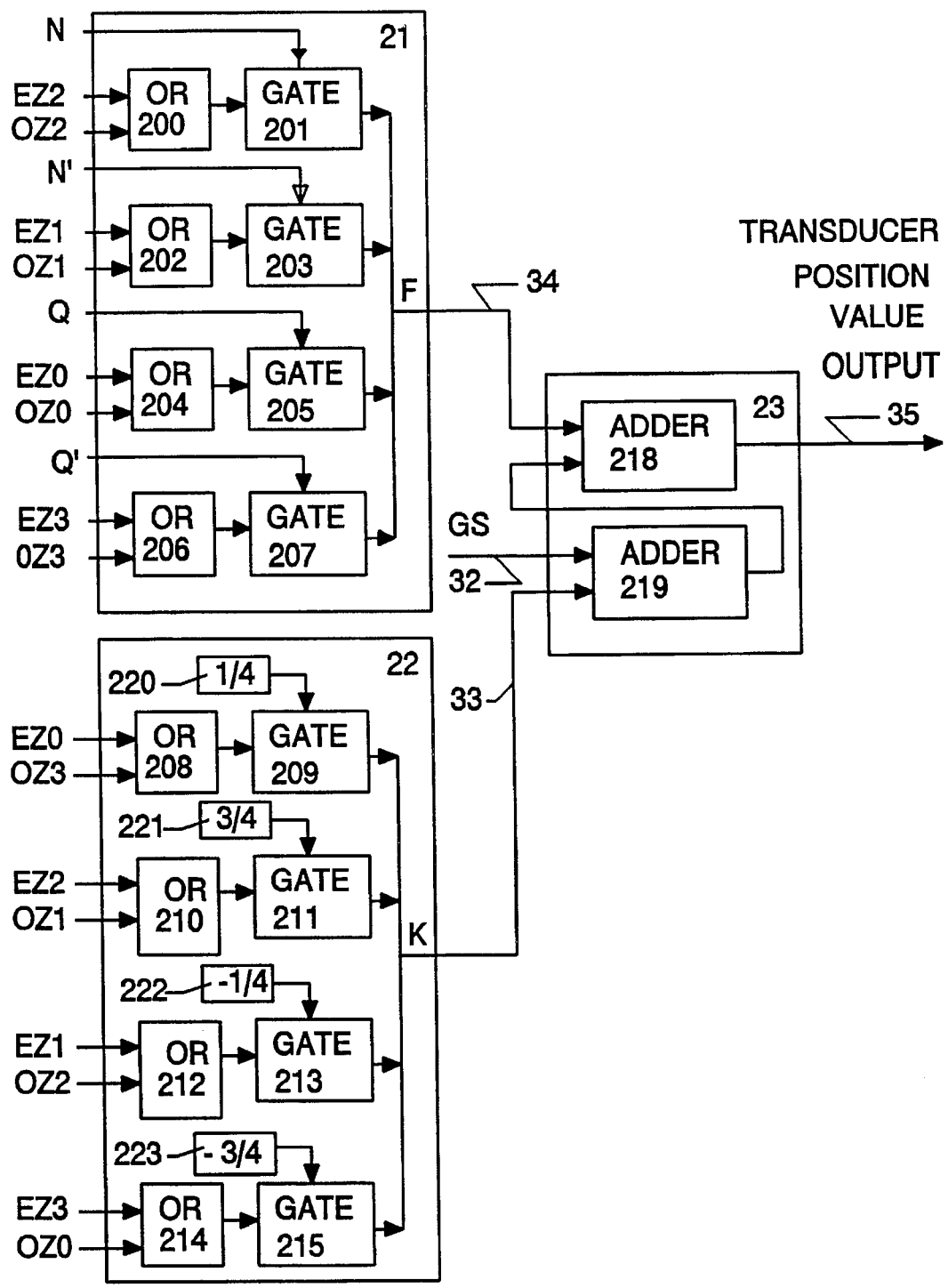
FIG. 6B is a logic diagram for the offset selector, the displacement selector and the adder of FIG. 1 where four zones are used.

Returning to FIG. 1, the foregoing procedure is executed by the combination of displacement generator 17, zone detector 19, offset selector 22, displacement selector 21 and adder 23. This combination of elements will be discussed with reference to FIGS. 1, 6A and 6B.

Displacement generator 17 receives the four digital values for the for servo burst A, B, C and D from servo burst detector 16. Subtractor 108 generates the digital value for displace signal Q by subtracting the digital value for B from the digital value for A. Subtractor 109 generates the digital value for displacement signal Q' by subtracting the digital value for A from the digital value for B. Subtractor 110 generates the digital value for displacement signal N by subtracting the digital value for D from the digital value for C. Subtractor 111 generates the digital value for displacement signal N' by subtracting the digital value for C from the digital value for D.

Zone detector 19 determines the applicable zone in accordance with steps 502, 503, 504, 505, 506, 507 and 508 of FIG. 5. Comparator 112 provides a high output X when the digital value for displacement signal N is greater than the digital value for displacement signal Q. Comparator 113 provides a high output Y on when the digital value for displacement signal N is greater than the digital value for displacement signal Q'. ANDs 114 through 121 decodes, in accordance with TABLE 1, whether signals E, X and Y are high H or low L to determine the zone in which the transducer 11 is located when the transducer 11 read the servo burst and the gray scale address.

TABLE 1

| | Quadrature SERVO PATTERN IV | | | |
|---|---|---|---|---|
| AND | E | X | Y | ZONE |
| 114 | H | H | H | EZ3 |
| 115 | H | H | L | EZ1 |
| 116 | H | L | H | EZ2 |
| 117 | H | L | L | EZ0 |
| 118 | L | H | H | OZ3 |
| 119 | L | H | L | OZ1 |
| 120 | L | L | H | OZ2 |
| 121 | L | L | L | OZ0 |

Since the system is sensitive to the servo pattern being used, the outputs of ANDs 114–121 will designate different zones as a function of the servo pattern selected. TABLE 2 listed the zone indicated by the output of ANDs 114–121 being high for each of the eight quadrature servo patterns.

TABLE 2

| | Quadrature SERVO PATTERN | | | | | | | |
|---|---|---|---|---|---|---|---|---|
| AND | I | II | III | IV | V | VI | VII | VIII |
| 114 | EZ2 | EZ1 | EZ0 | EZ3 | EZ1 | EZ2 | EZ0 | EZ3 |
| 115 | EZ3 | EZ0 | EZ2 | EZ1 | EZ3 | EZ0 | EZ1 | EZ2 |
| 116 | EZ0 | EZ3 | EZ1 | EZ2 | EZ0 | EZ3 | EZ2 | EZ1 |
| 117 | EZ1 | EZ2 | EZ3 | EZ0 | EZ2 | EZ1 | EZ3 | EZ0 |
| 118 | OZ2 | OZ1 | OZ0 | OZ3 | OZ1 | OZ2 | OZ0 | OZ3 |
| 119 | OZ3 | OZ0 | OZ2 | OZ1 | OZ3 | OZ0 | OZ1 | OZ2 |
| 120 | OZ0 | OZ3 | OZ1 | OZ2 | OZ0 | OZ3 | OZ2 | OZ1 |
| 121 | OZ1 | OZ2 | OZ3 | OZ0 | OZ2 | OZ1 | OZ3 | OZ0 |

The eight outputs of zone detector 19 are received by offset selector 22 and displacement selector 21. Offset selector 22 has registers 220, 221, 222 and 223 for providing digital offset values, ¼, ¾, −¼ and −¾ respectively to gates 209, 211, 213 and 215 respectively. Digital offset value ¼ will be transferred through transmission gate 209 whenever either EZ0 or OZ3 is high to OR 208 and will be provided as output signal K on line 33. Digital offset value ¾ will be transferred through transmission gate 211 whenever either EZ2 or OZ1 is high to OR 210 and will be provided as output signal K on line 33. Digital offset value −¼ will be transferred through transmission gate 213 whenever either EZ1 or OZ2 is high to OR 212 and will be provided as output signal K on line 33. Digital offset value −¾ will be transferred through transmission gate 215 whenever either EZ3 or OZ0 is high to OR 215 and will be provided as output signal K on line 33. While the offset selector 22 is discussed with respect to the use of quadrature pattern IV, the configuration of offset selector remains the same for the other seven quadrature servo patters.

Displacement selector 21 receives the four digital displacement signals N, Q, N' and Q' from displacement generator 17. Displacement signal N will be transferred through transmission gate 201 when either EZ2 or OZ2 is high to OR 200 and will be provided as displacement signal F on line 34. Displacement signal N' will be transferred through transmission gate 203 when either EZ1 or OZ1 is high to OR 202 and will be provided as displacement signal F on line 34. Displacement signal Q will be transferred through transmission gate 205 when either EZ0 or OZ0 is high to OR 204 and will be provided as displacement signal F on line 34. Displacement value Q' will be transferred through transmission gate 207 when either EZ3 or OZ3 is high to OR 206 and will be provided as displacement signal F on line 34.

Displacement selector 21 is sensitive to the quadrature servo pattern being used such that the proper displacement signal F transferred onto line 34 by transmission gates 201, 203, 205 and 207 is a function of the quadrature servo pattern being used.

TABLE 3 lists the input displacement signal to each transmission gate 201, 203, 205 and 207 for each of the eight quadrature servo patterns.

TABLE 3

| GATE | Quadrature SERVO PATTERN | | | | | | | |
|---|---|---|---|---|---|---|---|---|
| | I | II | III | IV | V | VI | VII | VIII |
| 201 | Q' | Q | N' | N | Q' | Q | N' | N |
| 203 | Q | Q' | N | N' | Q | Q' | N | N' |
| 205 | N | N' | Q' | Q | N' | N | Q | Q' |
| 207 | N' | N | Q | Q' | N | N' | Q' | Q |

Gray scale generator 20 provides a digital integer value GS on line 32 that is the gray scale address read by the transducer 11. Adder 23 includes adder 218 and adder 219. Adder 219 adds together the digital values for signal GS and signal K on line 32 and 33 respectively. The output of adder 218 is the center signal for the center of the zone selected by zone detector 19 for the gray scale address read by transducer 11. Adder 218 adds the center signal and the displacement signal F to generate a position signal at the output of adder 218 that reflects the position of transducer 11 with respect to the center of gray scale area 0 on the surface of the disk.

The combination of the recorded servo band employing one of the quadrature servo patterns and gray scale band of sequentially addressed gray scale areas essentially provides a ruler that can be used to measure the radial position of the transducer from a reference point on the surface of the disk. No ambiguity is experience when the transducer is centered over a boundary between two adjacent gray scale areas, that is in a blank area between adjacent gray code areas. For example using the quadrature servo pattern IV shown in FIG. 3, assume that the transducer is centered over the boundary between gray scale areas 4 and 5 of FIG. 3. Under this condition, displacement signal N will not be greater displacement signal Q and displacement signal N will be greater then displacement signal Q'. The gray scale detector will either detect gray scale address 4 or 5. Referring to FIG. 5, if the gray scale detector 15 detects the address to be 4 then step 502 will branch to step 503, step 503 will branch to step 505 that will select zone 2 and provide the position of the transducer 11 as GS+¾+N, that is 4.75+N, in step 509. If the gray scale detector 15 detects the address to be 5, then step 502 will branch to step 504, step 504 will branch to step 507 that will select zone 2 and provide the position of the transducer 11 as GS −¼+N, that is 4.75+N, in step 513. Thus the position value for the transducer is the same regardless of whether the gray scale detector decodes the gray scale address as being 4 or 5. Therefore this system provides an unambiguous position value for the transducer between the outer diameter OD and the inner diameter ID across all data tracks that permits track following operation to operate across the entire width of a data track.

While it is not recommended, if an erroneous position value or no position value for the transducer due to the ambiguity location of the transducer, as described above, can be tolerated by the system, then only zones 1 and 0 for the even gray scale addressed areas and zones 2 and 3 for the odd gray scale addressed areas need be determined in generating a position value for the transducer for quadrature servo pattern IV. This would simplify the method shown in FIG. 5 and the logic shown in FIGS. 6A and 6B.

Figure 8:
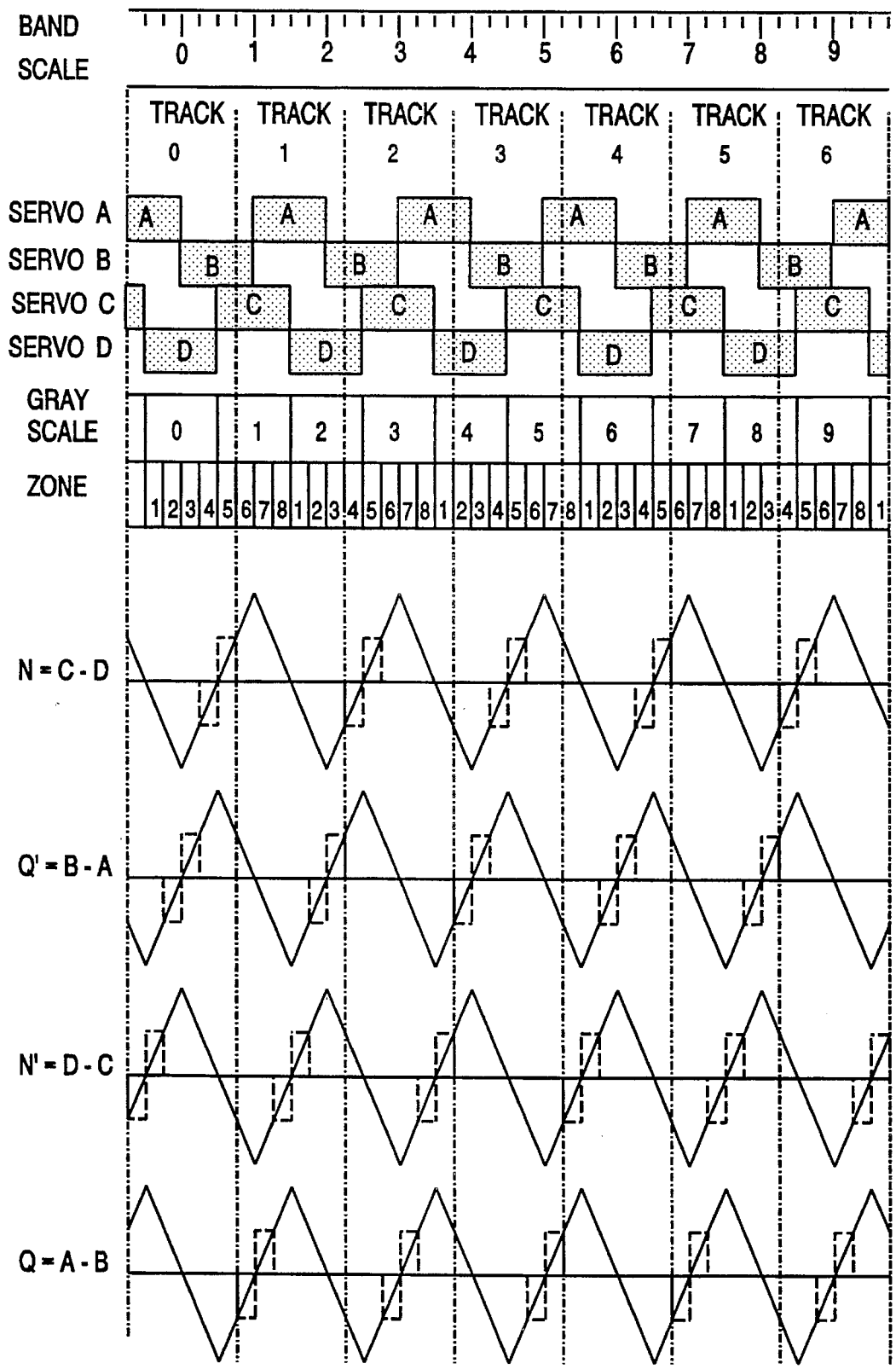
FIG. 8 is an illustration of the eight quadrature servo patterns of the invention and the relationship between track addresses, gray scale addresses and eight zones.

Referring to FIG. 8, a second embodiment of the inventions is shown where the starting position of the gray scale area 0 and the gray scale band has been moved and the number of zones has been increased from four to eight.

Figure 7A:
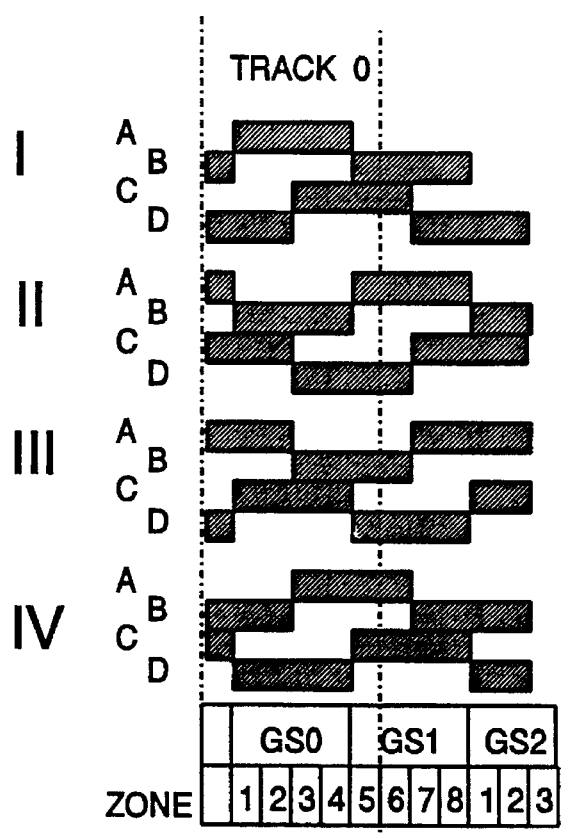
FIGS. 7(a–b) is a representation of the embedded quadrature servo pattern of the servo band and the gray scale band on the disk surface, a band scale in gray scale units, four zones associated with each odd and even gray scale area, waveforms generated from the four servo burst and the area of the waveform used by the system for each of the zones.
Figure 7B:
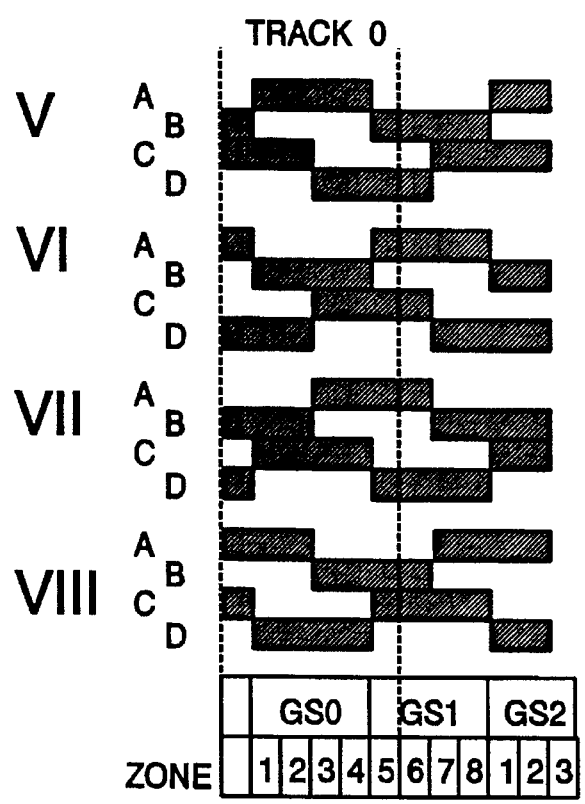

As to the first element of the invention, FIG. 8 shows seven data tracks, data track addresses 0 through 6, the quadrature servo pattern VIII of FIG. 7 (note that the servo patterns of FIG. 7 correspond to the servo patterns of FIG. 4) and the gray scale band extending across those seven data tracks. Each servo burst in all quadrature servo patterns I through VIII of FIG. 7 has a width equal to ⅔*W of the width W of a data track.

Referring to FIG. 7, a first set of quadrature servo patterns is comprised of quadrature servo patterns I, II, III and IV. Each quadrature pattern in the first set is characterized by an A burst which initiates at the mid point of the D burst of the preceding quadrature servo pattern, a B burst initiating at the point of termination of the A burst, a C burst initiating at the mid point of the A burst and a D burst initiating at the point of termination of the C burst and terminating at the mid point of the A burst of the following quadrature servo pattern. A second set of quadrature servo patterns is comprised of quadrature servo patterns V, VI, VII and VIII. Each quadrature servo pattern of the second set is characterizes by an A burst which initiates at the mid point of the C burst of the preceding quadrature servo pattern, a B burst initiating at the point of termination of the A burst, a D burst initiating at the mid point of the A burst and a C burst initiating at the point of termination of the D burst and terminating at the mid point of the A burst of the following quadrature servo pattern.

The positioning measuring system is sensitive to the quadrature servo pattern used. The positioning measuring system requires that one of the four servo bursts of the quadrature servo pattern used must be centered in data track 0. Thus for the first set of quadrature servo pattern, quadrature servo pattern I has servo burst A centered in track 0, quadrature servo pattern II has servo burst B centered in track 0, quadrature servo pattern III has servo burst C centered in track 0 and quadrature servo pattern IV has servo burst D centered in track 0. In like manner, for the second set of quadrature servo pattern, quadrature servo pattern V has servo burst A centered in track 0, quadrature servo pattern VI has servo burst B centered in track 0, quadrature servo pattern VII has servo burst C centered in track 0 and quadrature servo pattern VIII has servo burst D centered in track 0. The relationship of the four servo burst A, B, C and D for each quadrature servo pattern I, II, III, IV, V, VI, VII and VIII with the gray scale addresses GS0 AND GS1 of the gray scale band and four hypothetical zones 2, 0, 1 AND 3 associated with the gray scale addresses is shown and will be described in greater detail hereinafter.

Returning to FIG. 8, the quadrature servo pattern VIII is used to describe the position measuring system of the invention. As can be seen from FIG. 8, the quadrature servo pattern has an overall width of +e,fra 1.5+ee *W and is repeated three times across four data tracks 0, 1, 2 and 3. In so doing portions of the A, B, C and D bursts are distributed differently in each of the four data tracks. It should be noted that the distribution of the A, B, C and D burst for a given data track will be repeated every fourth data track. Therefore data track 0, 4, 8, 12, etc. will have the same distribution of the A, B, C and D burst, data tracks 1, 5, 9, 13, etc. will have the same distribution of the A, B, C and D burst, data tracks 2, 6, 10, 14, etc. will have the same distribution of the A, B, C and D burst and data tracks 3, 7, 11, 15, etc. will have the same distribution of the A, B, C and D burst.

The gray scale band comprises a plurality of sequential gray scale area where the width of each gray scale area is ⅔*W where w is the width of a data track. The definition of a gray scale area used in the discussion of the previous embodiment of the invention is applicable to this embodiment of the invention. The gray scale area 0 is initiated at a point ⅙ of a track width W from where track 0 is initiated on the surface of the disk. Each successive gray scale area is assigned the next integer in order such that the gray scale addresses are sequential between the outer diameter OD and the inner diameter ID of disk 10. The assigned gray scale address is recorded in each gray scale area. It is important to note that the gray scale addresses no longer directly reflects the data track addresses as the gray code areas did in the prior art. Therefore if the transducer read a gray scale address of 100 this does not mean that the transducer is reading information from data track 100.

A band scale of FIG. 8 is used in measuring the location of the center of each data track and the location of the transducer with reference to the surface of the disk 10. The band scale uses gray scale units as a basic measuring unit where a gray scale unit has a value of ⅔*W. The band scale area has a zero point located at the center of gray scale area 0.

Any track address TA can be converted into a track position TP expressed in gray scale units GS, which measures the center of the data track from the center of gray scale area 0, by the expression:

$$TP = \frac{3}{2} * TA.$$

For example the track position for data track 6 would be 9 and the track position for data track 3 would be 4.5. This is corroborated by comparing the center of data tracks 3 and 7 and the band scale in FIG. 8.

The system employs the concept of zones where each gray scale area is divided into four zones. An even addressed gray scale area is divided into zones 1, 2, 3 and 4 and an odd addressed gray scale area is divided into zones 5, 6, 7 and 8. The relationship between the zones and the gray scale areas is illustrated in FIGS. 7 and 8.

As can be seen from FIG. 7, the center of each gray scale area corresponds to a boundary between servo bursts A and B and the initiation and termination of a gray scale area corresponds to a boundary area between servo burst C and D for quadrature servo patterns III, IV, VII and VIII. In like manner, the center of each gray scale area corresponds to a boundary between servo bursts C and D and the initiation and termination of a gray scale area corresponds to a boundary area between servo burst A and B for quadrature servo patterns I, II, V and VI. Zones 1 and 8 will each have a border that is aligned with the boundary between servo burst C and D. Zones 2 and 3 will each have a border that is aligned with the boundary between servo burst A and B. Zones 4 and 5 will each have a border that is aligned with the boundary between servo burst D and C. Zones 6 and 7 will each have a border that is aligned with the boundary between servo burst B and A. Zones 1,3, 5 and 7 will always be to the immediate right of a boundary between the two servo burst for that quadrature servo pattern and zones 2,4, 6 and 8 will always be to the immediate left of a boundary between two servo burst for a given track.

In ever data track there is a boundary between two servo bursts at ⅙*W, ½*W and ⅚*W of the width W of a data track or when expressed as a displacement from the center of a data track at −⅓*W, 0 and ⅓*W locations in the data track. The location of these three boundaries for the track position TP for any track address TA can be expressed in gray scale units by the following expressions:

Left of center boundary = TP − ½;
Center boundary = TP;
Right of center boundary = TP + ½.

For example in data track 0, the left of center boundary is located at −0.5, the center boundary is located at 0 and the right of center boundary is located at 0.5. Further in track 5 the left of center boundary is located at 7, the center boundary is located at 7.5 and the right of center boundary is located at 8. This is corroborated by comparing the boundary of two servo bursts in tracks 0 and 5 with the band scale in FIG. 8.

The center of each gray scale area correlates with an integer value on the band scale such that by reading the gray scale area address GS, the integer portion of a border signal is obtained. By determining the zone within the gray scale area whose gray scale address was read by the transducer the fractional portion of the border signal can be obtained. A value of the border signal as a function of the zones can be determined by the following relationships:

Zones 1 and 5 = GS − ½;
Zones 2, 3, 6 and 7 = GS + 0; and
Zones 4 and 8 = GS + ½.

A displacement signal having a value indicative of the displacement from of the transducer from a boundary between two servo bursts is obtained from the difference in the magnitude read for the two servo bursts whose boundary is on the border of that zone. By adding the displacement signal to the border signal a position signal is obtained indicative of the position of the transducer relative to the center of gray scale area 0.

As to the second element of this second embodiment of the invention, the position generator has been modified to generate for the transducer a digital position signal from the received values of the magnitude sampled from the four servo bursts and the address of the gray scale area.

Figure 10A:
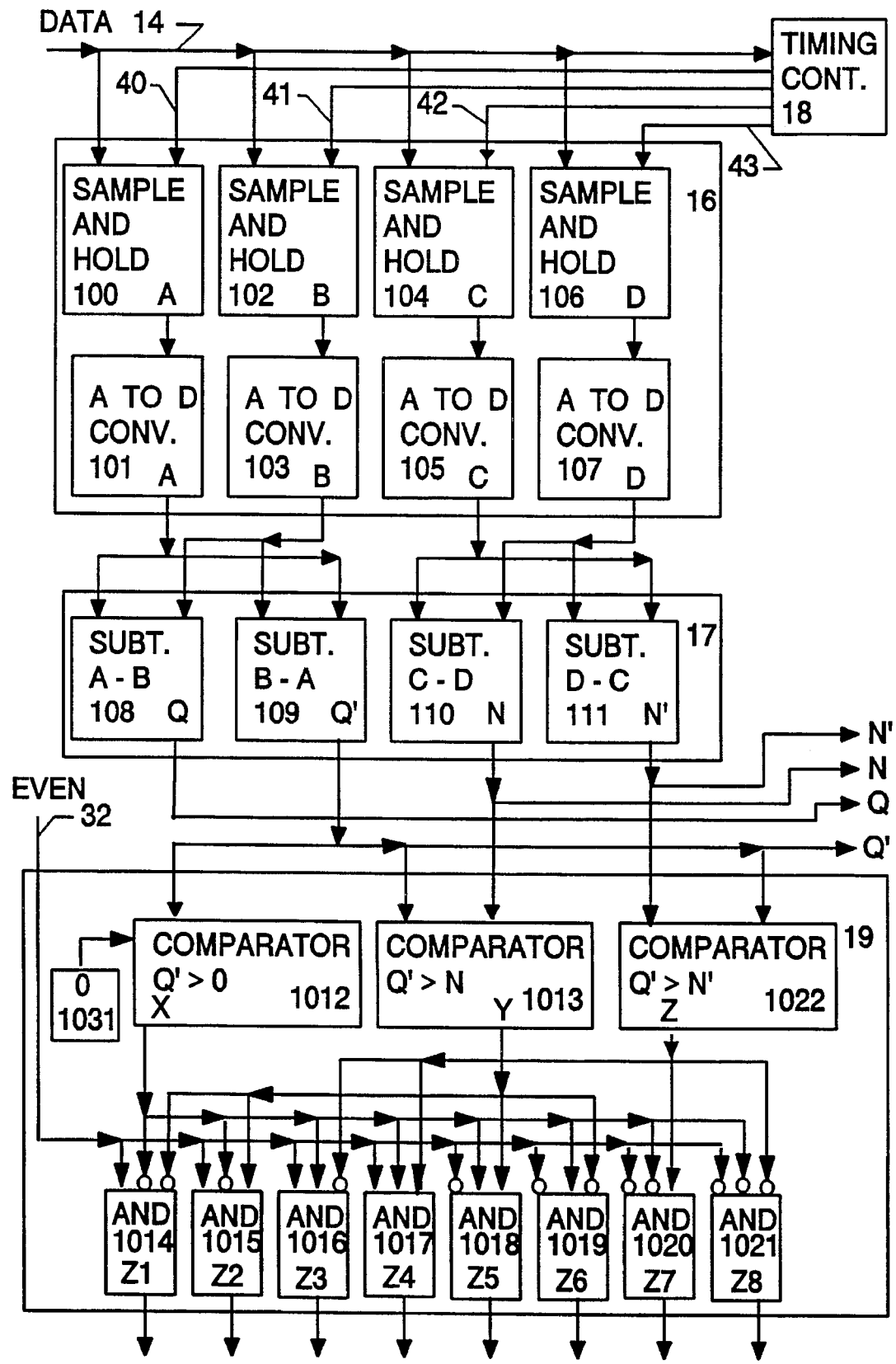
FIG. 10A is a logic diagram for the servo burst detector, the displacement generator and the zone detector of FIG. 1 where eight zones are used.

Referring to FIG. 10A, a servo burst detector 16 is shown. Sample and hold circuit 100 will sample and hold the magnitude of servo burst A from the data on line 14 under the control of the control signal on line 40 from timing controller 18. A to D converter 101 converts the magnitude of the sample being held by sample and hold circuit 100 into a digital value A for servo burst A. Sample and hold circuit 102 will sample and hold the magnitude of servo burst B from the data on line 14 under the control of the control signal on line 41 from timing controller 18. A to D converter 103 converts the magnitude of the sample being held by sample and hold circuit 102 into a digital value B for servo burst B. Sample and hold circuit 104 will sample and hold the magnitude of servo burst C from the data on line 14 under the control of the control signal on line 42 from timing controller 18. A to D converter 105 converts the magnitude of the sample being held by sample and hold circuit 104 into a digital value C for servo burst C. Sample and hold circuit 106 will sample and hold the magnitude of servo burst D from the data on line 14 under the control of the control signal on line 43 from timing controller 18. A to D converter 107 converts the magnitude of the sample being held by sample and hold circuit 106 into a digital value D for servo burst D.

The position generator generates a digital value for the position of transducer 11 from the digital values of the four digital servo burst values A, B, C and D, the digital integer gray scale area address GS and whether signal E is high or low by the following procedure.

Figure 9:
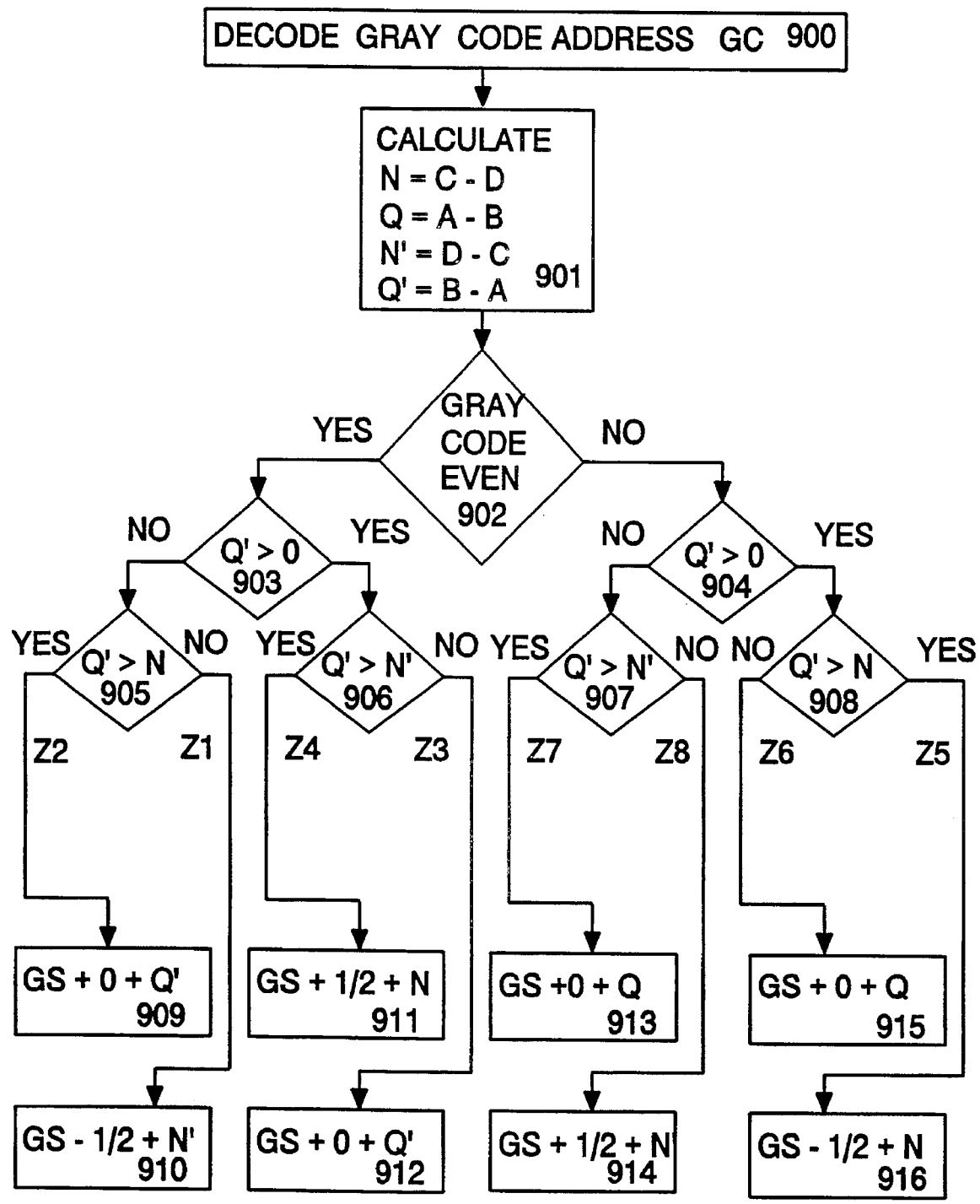
FIG. 9 is a flow chart of the method used in deriving the position signal of the invention employing eight zones.

Referring to FIG. 9, there is shown a flow chart for generating the digital position signal for the position of the transducer 11. Step 900 decodes the encoded gray scale address into the digital gray scale area address GS for the gray scale area read by transducer 11. Step 901 generates the values for four displacement signals N, Q, N' and Q' from the four digital servo bursts values A, B, C and D. The waveforms for these four displacement signals is shown in FIG. 8. The four values for the four displacement signals are generated as follows:

$$N = C - D;$$
$$Q = A - B;$$
$$N' = D - C; \text{ and}$$
$$Q' = B - A.$$

As can be seen from FIG. 8, displacement signal N will have a positive slope and a zero crossing at the boundary servo burst D and C where servo burst D is to the left of the boundary and servo burst C is to the right of the boundary. Therefore displacement signal N will have a positive value in zone 5 to the right of the boundary and will have a negative value in zone 4 to the left of the boundary.

Displacement signal Q will have a positive slope and a zero crossing indicating the boundary servo burst B and A where servo burst B is to the left of the boundary and servo burst A is to the right of the boundary. Therefore displacement signal Q will have a positive value in zone 3 to the right of the boundary and will have a negative value in zone 4 to the left of the boundary.

Displacement signal N' will have a positive slope and a zero crossing indicating the boundary servo burst C and D where servo burst C is to the left of the boundary and servo burst D is to the right of the boundary. Therefore displacement signal N' will have a positive value in zone 1 to the right of the boundary and will have a negative value in zone 8 to the left of the boundary.

Displacement signal Q' will have a positive slope and a zero crossing indicating the boundary servo burst A and B where servo burst A is to the left of the boundary and servo burst B is to the right of the boundary. Therefore displacement signal Q' will have a positive value in zone 7 to the right of the boundary and will have a negative value in zone 6 to the left of the boundary.

The digital values of displacement signals N, Q, N' and Q' are used in generating the digital value for the position signal for transducer 11. The dotted areas indicate the portion of the waveform for displacement signals N, Q, N' and Q' that is used to derive the displacement values for the eight zones.

Returning to FIG. 9, the series of steps goes on to determine which zone and displacement signal is to be used in generating the position signal for the position of the transducer 11. To this end, step 902 determines if the address read from the gray scale area was odd or even.

If the address is even then step 903 compares the value of displacement signal Q' with the value of 0. If displacement signal Q' is greater than 0, then the zone will be either zone 3 or 4. Step 906 compares the value of displacement signal Q' with the value of displacement signal N'. If displacement signal Q' is greater than displacement signal N' then the zone is zone 4. Since the digital value of N is always associated with zone 4, the value for the border signal for zone 4 is added to the digital value of displacement signal N by step 911. If displacement signal Q' is not greater than displacement signal N', then the zone is zone 3. Since the digital value of Q' is always associated with zone 3, the value for border signal for zone 3 is added to the digital value of displacement signal Q' by step 912. If displacement signal Q' is not greater then 0, then the zone will be either zone 1 or 2. Step 905 compares the value of displacement signal Q' to the value of displacement signal N. If displacement signal Q' is greater than displacement signal N then the zone is zone 2. Since the digital value of Q' is always associated with zone 2, the value for the border signal for zone 2 is added to the digital value of displacement signal Q' by step 909. If displacement signal Q' is not greater than displacement signal N, then the zone is zone 1. Since the digital value of N' is always associated with zone 1, the value for the border signal for zone 1 is added to the digital value of displacement signal N' by step 910.

If the address is odd then step 904 compares the value of displacement signal Q' with the value of 0. If displacement signal Q' is greater than 0, then the zone will be either zone 5 or 6. Step 908 compares the value of displacement signal Q' with the value of displacement signal N. If displacement signal Q' is greater than displacement signal N' then the zone is zone 5. Since the digital value of N is always associated with zone 5, the value for the border signal for zone 5 is added to the digital value of displacement signal N by step 916. If displacement signal Q' is not greater than displacement signal N, then the zone is zone 6. Since the digital value of Q is always associated with zone 6, the value for the border signal for zone 6 is added to the digital value of displacement signal Q by step 915. If displacement signal Q' is not greater then 0, then the zone will be either zone 7 or 8. Step 907 compares the value of displacement signal Q' to the value of displacement signal N'. If displacement signal Q' is greater than displacement signal N' then the zone is zone 7. Since the digital value of Q is always associated with zone 7, the value for the border signal for zone 7 is added to the digital value of displacement signal Q by step 913. If displacement signal Q' is not greater than displacement signal N', then the zone is zone 8. Since the digital value of N' is always associated with zone 8, the value for the border signal for zone 8 is added to the digital value of displacement signal N' by step 914.

The value of the center signal and the displacement signal for each zone is a function of the servo pattern selected. Tables 4 and 5 sets forth the values for the border signal for all eight zones for all eight servo patterns.

TABLE 4

| | BORDER SIGNAL VALUES | | | |
|---|---|---|---|---|
| | SERVO PATTERN | | | |
| ZONE | I | II | III | IV |
| 1 | GS − ½ + Q | GS − ½ + Q' | GS − ½ + N | GS − ½ + N' |
| 2 | GS + 0 + N | GS + 0 + N' | GS + 0 + Q' | GS + 0 + Q |
| 3 | GS + 0 + N | GS + 0 + N' | GS + 0 + Q' | GS + 0 + Q |
| 4 | GS + ½ + Q' | GS + ½ + Q | GS + ½ + N' | GS + ½ + N |
| 5 | GS − ½ + Q' | GS − ½ + Q | GS − ½ + N' | GS − ½ + N |
| 6 | GS + 0 + N' | GS + 0 + N | GS + 0 + Q | GS + 0 + Q' |
| 7 | GS + 0 + N' | GS + 0 + N | GS + 0 + Q | GS + 0 + Q' |
| 8 | GS + ½ + Q | GS + ½ + Q' | GS + ½ + N | GS½ + N' |

TABLE 5

BORDER SIGNAL VALUES

| ZONE | SERVO PATTERN | | | |
|---|---|---|---|---|
| | V | VI | VII | VIII |
| 1 | GS – ½ + Q | GS – ½ + Q' | GS – ½ + N | GS – ½ + N' |
| 2 | GS + 0 + N' | GS + 0 + N | GS + 0 + Q | GS + 0 + Q' |
| 3 | GS + 0 + N' | GS + 0 + N | GS + 0 + Q | GS + 0 + Q' |
| 4 | GS + ½ + Q' | GS + ½ + Q | GS + ½ + N' | GS + ½ + N |
| 5 | GS – ½ + Q' | GS – ½ + Q | GS – ½ + N' | GS – ½ + N |
| 6 | GS + 0 + N | GS + 0 + N' | GS + 0 + Q' | GS + 0 + Q |
| 7 | GS + 0 + N | GS + 0 + N' | GS + 0 + Q' | GS + 0 + Q |
| 8 | GS + ½ + Q | GS + ½ + Q' | GS + ½ + N | GS½ + N' |

Figure 10B:
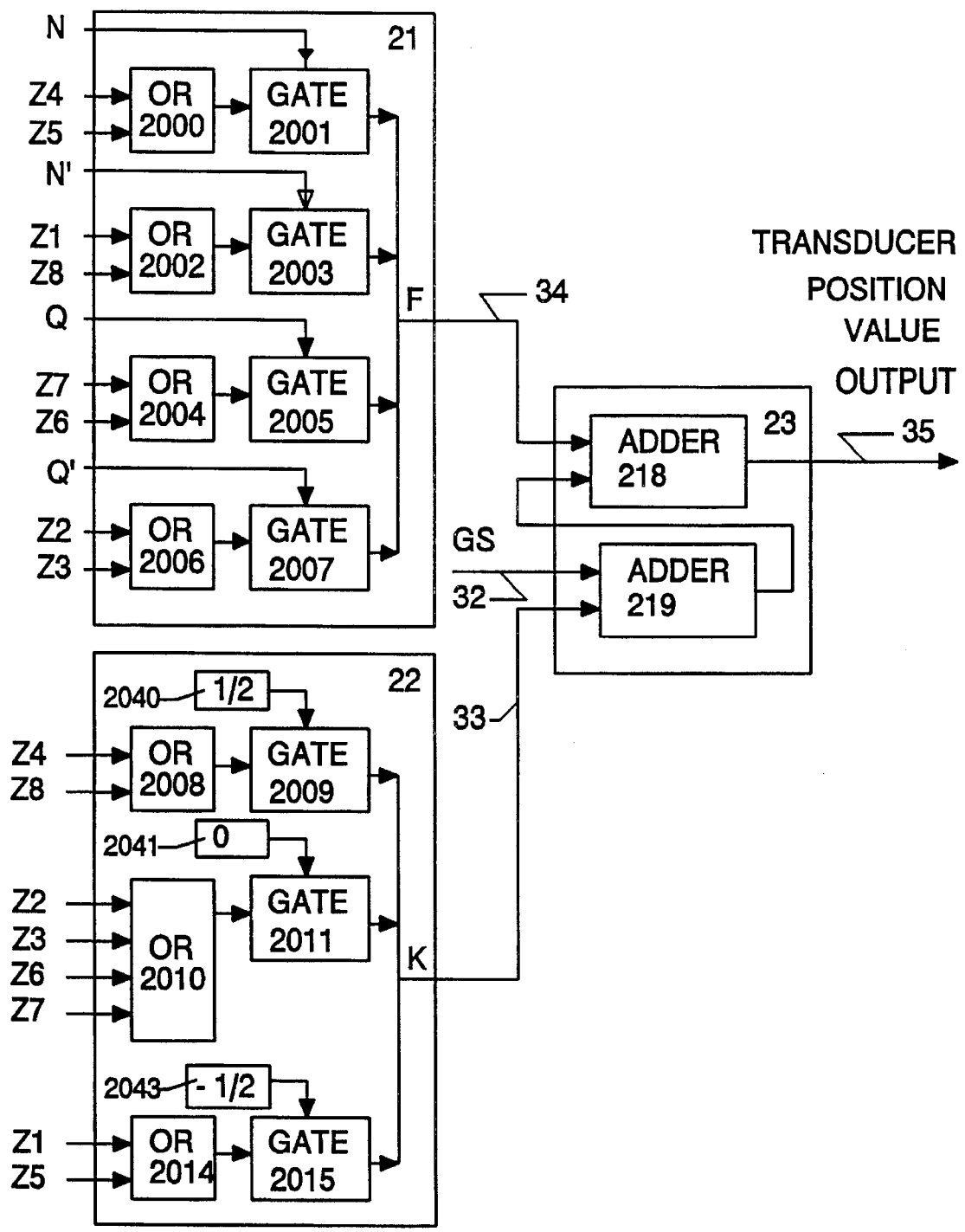
FIG. 10B is a logic diagram for the offset selector, the displacement selector and the adder of FIG. 1 where eight zones are used.

Returning to FIG. 1, the foregoing procedure is executed by the combination of displacement generator 17, zone detector 19, offset selector 22, displacement selector 21 and adder 23. This combination of these elements will be discussed with reference to FIGS. 1, 10A and 10B.

Displacement generator 17 receives the four digital values for the for servo burst A, B, C and D from servo burst detector 16. Subtractor 108 generates the digital value for displacement signal Q by subtracting the digital value for B from the digital value for A. Subtractor 109 generates the digital value for displacement signal Q' by subtracting the digital value for A from the digital value for B. Subtractor 110 generates the digital value for displacement signal N by subtracting the digital value for D from the digital value for C. Subtractor 111 generates the digital value for displacement value N' by subtracting the digital value for C from the digital value for D.

Zone detector 19 determines the zone in accordance with steps 902, 903, 904, 905, 906, 907 and 908 of FIG. 9. Comparator 1012 provides a high output X when the digital value for displacement signal Q' is greater than the digital value 0 from register 1031. Comparator 1013 provides a high output Y on when the digital value for displacement signal Q' is greater than the digital value for displacement signal N. Comparator 1022 provides a high output Z when the digital value for displacement Q' is greater than the digital value for displacement signal N'. ANDs 1014 through 1021 decodes in accordance with TABLE 6 whether signals E, X, Y and Z are high H or low L to determine the zone in which the transducer 11 is located when the transducer 11 read the servo burst and the gray scale address.

Since the system is sensitive to the servo pattern being used, the functions of comparators will change as a function of the servo pattern selected. TABLE 7 listed the function of Comparators 1012, 1013 and 1022 for each of the eight quadrature servo patterns.

TABLE 6

| | Quadrature SERVO PATTERN VIII | | | | |
|---|---|---|---|---|---|
| AND | E | X | Y | Z | ZONE |
| 1014 | H | L | L | | Z1 |
| 1015 | H | L | H | | Z2 |

TABLE 6-continued

| | Quadrature SERVO PATTERN VIII | | | | |
|---|---|---|---|---|---|
| AND | E | X | Y | Z | ZONE |
| 1016 | H | H | | L | Z3 |
| 1017 | H | H | | H | Z4 |
| 1018 | L | H | H | | Z5 |
| 1019 | L | H | L | | Z6 |
| 1020 | L | L | | H | Z7 |
| 1021 | L | L | | L | Z8 |

TABLE 7

| SERVO PATTERN | COMPARATOR 1012 | COMPARATOR 1013 | COMPARATOR 1022 |
|---|---|---|---|
| I | N' > 0 | N' > Q | N' > Q' |
| II | N > 0 | N > Q' | N > Q |
| III | Q' > 0 | Q' > N' | Q > N |
| IV | Q > 0 | Q > N | Q > N' |
| V | N' > 0 | N' > Q' | N' > Q |
| VI | N > 0 | N > Q | N > Q' |
| VII | Q > 0 | Q > N' | Q > N |
| VIII | Q' > 0 | Q' > N | Q' > N' |

The eight outputs of zone detector 19 are received by offset selector 22 and displacement selector 21. Offset selector 22 has registers 2040, 2041 and 2043 for providing the digital offset values of ½, 0, and –½ respectively to gates 2009, 2011 and 2015 respectively. Digital offset value ½ will be transferred through transmission gate 2009 whenever either Z4 or Z5 is high to OR 2008 and will be provided as output signal K on line 33. Digital offset value 0 will be transferred through transmission gate 2011 whenever either Z2, Z3, Z6 or Z7 is high to OR 2010 and will be provided as output signal K on line 33. Digital input value –½ will be transferred through transmission gate 2015 whenever either Z1 or Z5 is high to OR 2014 and will be provided as output signal K on line 33. While the offset selector is discussed with respect to the use of quadrature pattern VIII, the configuration of offset selector remains the same for the other seven quadrature servo patters.

Displacement selector 21 receives the four displacement signals N, Q, N' and Q' from displacement generator 17. Displacement signal N will be transferred through transmission gate 2001 when either Z4 or Z5 is high to OR 2000 and will be provided as displacement signal F on line 34. Displacement signal N' will be transferred through transmission gate 2003 when either Z1 or Z8 is high to OR 2002 and will be provided as displacement signal F on line 34. Displacement signal Q will be transferred through transmission gate 2005 when either Z7 or Z6 is high to OR 2004 and will be provided as displacement signal F on line 34. Displacement signal Q' will be transferred through transmission gate 2007 when either Z2 or Z3 is high to OR 2006 and will be provided as displacement signal F on line 34.

Displacement selector 21 is sensitive to the quadrature servo pattern being used such that the proper displacement signal F transferred onto line 34 by transmission gates 2001, 2003, 2005 and 2007 is a function of the quadrature servo pattern is being used.

TABLE 8 lists the input displacement signals to each transmission gate 2001, 2003, 2005 and 2007 for each of the eight quadrature servo patterns.

TABLE 8

| INPUT TO GATE | SERVO PATTERN | | | | | | | |
|---|---|---|---|---|---|---|---|---|
| | I | II | III | IV | V | VI | VII | VIII |
| 2001 | Q' | Q | N' | N | Q' | Q | N' | N |
| 2003 | Q | Q' | N | N' | Q | Q' | N | N' |
| 2005 | N' | N | Q | Q' | N | N' | Q' | Q |
| 2007 | N | N' | Q' | Q | N' | N | Q | Q' |

Gray scale generator 20 provides a digital integer value on line 32 that is the gray scale address GS read by the transducer 11. Adder 23 includes adder 218 and adder 219. Adder 219 adds together the digital values for signal GS and K on line 32 and 33 respectively. The output of adder 219 is the border signal for the border of the zone selected by zone detector 19 for the gray scale address read by transducer 11. Adder 218 adds border signal and the displacement signal F to produce the position signal on line 35 that indicates the position of transducer 11 with respect to the center of gray scale area 0 on the surface of the disk.

Figure 2:
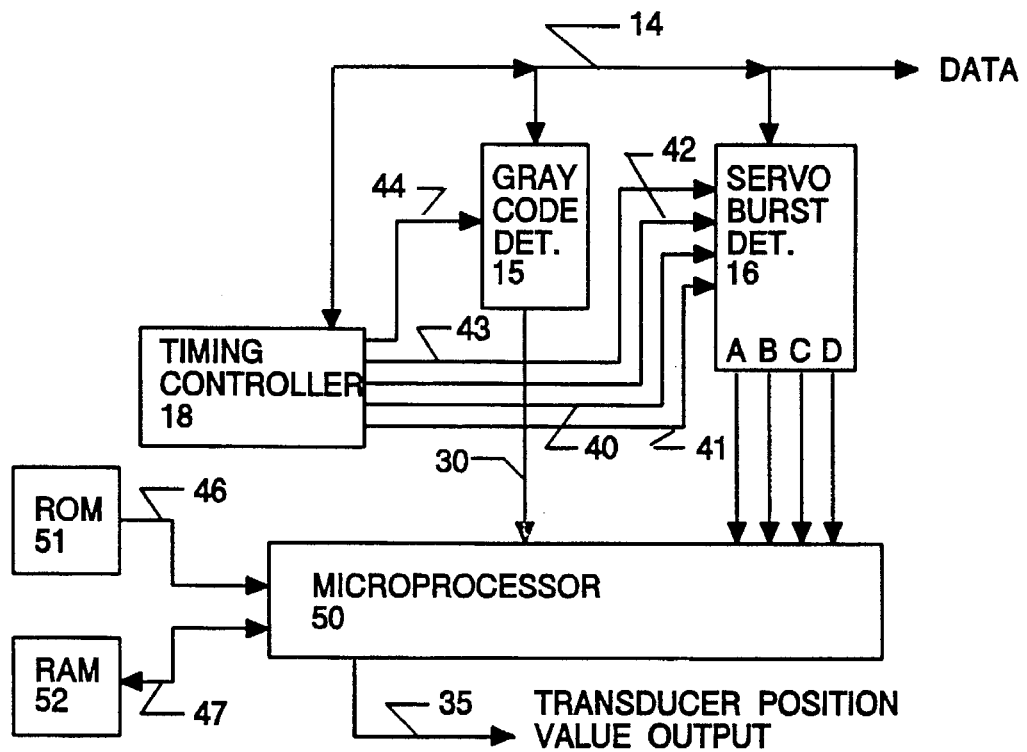
FIG. 2 is a block diagram of a disk drive system employing a programmed microprocessor to generate the position signal of the present invention.

FIG. 2 is another embodiment of the invention where zone gray scale generator 20, displacement generator 17, zone detector 19, offset selector 22 and displacement selector 21 and adder 23 of the first and second embodiments discussed above is replaced by microprocessor 50, RAM 52 and ROM 51. Either RAM 52 of ROM 51 includes a microprogram that carries out the steps of the flow chart of FIG. 5 or 9 for quadrature servo pattern IV or VIII or as modified for any of the other six quadrature servo patterns in the manner discussed above for the modification of the logic shown in FIGS. 1, 6A and 6B and 10A and 10B for a different quadrature servo pattern. It is well within the skill of an art for programming microprocessors in the microprocessor program language associated with that microprocessor to provide a program which is stored preferably in the ROM 51 to generate the position value of the transducer from the four displacement value N. N' Q and Q" derived from the digital values of the four servo burst of the quadrature servo pattern and from the digital (encoded or not encoded) gray scale address read GS read by transducer 11.

For all embodiments, the position signal for the transducer may be subtracted from the data track center position value, which indicating the center of the addressed data track, to obtain an error signal that can be used in a track following operation. Further the position signal for the transducer may be subtracted from the data track center position value of a target track during a seek operation to provide a value indicating how close the transducer is to the center of target track during a seek operation. This in turn may be used to control the velocity of the transducer during the seek operation. Further since the seek operation is now performed with the reference to the center of the addressed track being used as a reference, the settling time after a seek operation can be substantially reduced.

Finally, it is recognized that the values of −½, ½, −¼, ¼, −¾ and ¾ used in the offset selector 22 are not absolute numbers but rather scaled to equal that portion of a gray scale area's width W as previously defined. Further the displacement values may also have to be scaled so as to properly reflect the displacement of the transducer from the boundary between two servo bursts in gray scale units. Such scaling is commonly done in disk drive servo systems and is well understood by those skilled in the art of servo systems for disk drive systems.

While the invention has been particularly shown and described with reference to the described embodiment therefore, it will be understood by those skilled in the art that changes in form and detail may be made therein without departing from the spirit and scope of the invention. Given the above disclosure of general concepts and specific embodiments, the scope of the protection sought is defined by the following.

What is claimed is:

1. A system for measuring the distance of a transducer from a reference point on a disk in a sector servo disk drive system comprising:

a disk surface divided into sectors where each sector comprises Z data tracks, a servo band and a gray scale band recorded across all said Z data tracks, said servo band comprising a quadrature servo pattern repeated 0.75*Z times, said gray scale band comprises 1.5*Z consecutively addressed gray scale areas; and a position generator for generating from said quadrature servo pattern and an address of a gray scale area read by a transducer in said disk drive system a signal indicating a position of said transducer relative to a fixed reference point in said gray scale band on said disk.

2. The system of claim 1 wherein said quadrature servo pattern is comprised of a first, second, third and fourth burst where said first burst is initiated at the mid point of a fourth burst of a preceding quadrature servo pattern, said second burst is initiated at a point of termination of said first burst, said third burst is initiated at a mid point of said first burst and said fourth burst is initiated at a point of termination of said third burst and is terminated at a mid point of a first burst of a following quadrature servo pattern.

3. The system of claim 2 wherein said gray scale areas are consecutively addressed starting with address zero and said fixed reference point is located at a center of a gray scale area having an address of zero.

4. The system of claim 3 wherein:

each data track has a width W;

said first, second, third and fourth servo burst each have a width of ⅔*W; and each said gray scale area has a width of ⅔*W.

5. The system of claim 1 wherein said quadrature servo pattern is comprised of a first, second, third and fourth burst where said first burst is initiated at a mid point of a third burst of a preceding quadrature servo pattern, said second burst is initiated at a point of termination of said first burst, said fourth burst is initiated at a mid point of said first burst and said third burst is initiated at a point of termination of said fourth burst and is terminated at a mid point of a first burst of a following quadrature servo pattern.

6. The system of claim 5 wherein said gray scale areas are consecutively addressed starting with address zero and said fixed reference point is located at a center a gray scale area having an address of zero.

7. The system of claim 6 wherein:

each data track has a width W;

said first, second, third and fourth servo burst each have a width of ⅔*W; and each said gray scale area has a width of ⅔*W.

8. The system of claim 1 wherein said position generator segments each said gray scale area into two zones where a gray scale area having an even address is divided into zone 1 and zone 0 and a gray scale area having an odd addressed is divided into zone 2 and zone and where a center in each of said zones 0, 1, 2 and is located at a boundary between two of said four burst in said quadrature servo pattern.

9. The system of claim 8 wherein said position generator further comprises:

first means for generating a displacement signal having a value indicative of said transducer's displacement from said center of a zone associated with said gray scale area read by said transducer;

second means for generating a center signal having a value indicative of said zone's center from said fixed reference point; and third means for combining said center signal and said displacement signal to generate a digital signal having a value indicative of said transducer's position from said fixed reference point recorded on said disk.

10. The system of claim 9 wherein said first means comprises:

a fourth means for converting the magnitude of an analog signal for a first, second, third and fourth burst of said quadrature servo pattern read by said transducer into a corresponding first, second, third and fourth digital signal; and a fifth means for generating a first displacement signal (Q) by subtracting said second digital signal from said first digital signal, a second displacement (Q') signal by subtracting said first digital signal from said first second digital signal, a third displacement (N) signal by subtracting said fourth digital signal from said third digital signal and fourth displacement signal (N') by subtracting said third digital signal from said fourth digital signal.

11. The system of claim 10 wherein said second means comprises:

a zone detector for generating a zone signal which selects a selected zone from said two zones associated with said gray scale area read by said transducer as a function of a value of each of said first, second, third and fourth displacement signals and whether said address of said gray scale area is odd or even;

sixth means for generating said center signal as a function of said zone signal where said center signal is a distance from said fixed reference point to the center of said selected zone.

12. The system of claim 11 wherein said first means further comprises:

a displacement selection means for selecting one of said first, second, third and fourth displacement signals as said displacement signal as a function of said zone signal generated by said zone detector.

13. The system of claim 12 wherein said third means comprises:

an adder for adding together said center signal and said displacement signal to generate a position signal whose value is said transducer's distance from said fixed reference point recorded on said disk.

14. The system of claim 8 wherein each of said data tracks has a track address TA whose center TAC, expressed in gray scale units, is located from said fixed reference point in said gray scale band by the relationship TAC=(1.5*TA)+0.25.

15. The system of claim 1 wherein said position generator segments each said gray scale area into four zones where a gray scale area having an even address is divided into zones 1, 2, 3 and 4 and a gray scale area having an odd addressed is divided into zones 5, 6, 7 and 8 and where each zone has a border on a boundary between two of said four servo bursts in said quadrature servo pattern.

16. The system of claim 15 wherein said position generator further comprises:

first means for generating a displacement signal having a value indicative of said transducer's displacement from said border of a zone associated with said gray scale area read by said transducer;

second means for generating a border signal having a value indicative of said zone's border from said fixed reference point; and third means for combining said border signal and said displacement signal to generate a digital signal having a value indicative of said transducer's position from said fixed reference point recorded on said disk.

17. The system of claim 16 wherein said first means comprises:

a fourth means for converting the magnitude of an analog signal for a first, second, third and fourth burst of said quadrature servo pattern read by said transducer into a corresponding first, second, third and fourth digital signal; and a fifth means for generating a first displacement signal (Q) by subtracting said second digital signal from said first digital signal, a second displacement (Q') signal by subtracting said first digital signal from said second digital signal, a third displacement (N) signal by subtracting said fourth digital signal from said third digital signal and fourth displacement signal (N') by subtracting said third digital signal from said fourth digital signal.

18. The system of claim 17 wherein said second means comprises:

a zone detector for generating a zone signal which selects a selected zone from said four zones associated with said gray scale area read by said transducer as a function of a value of each of said first, second, third and fourth displacement signals and whether said address of said gray scale area is odd or even;

sixth means for generating said border signal as a function of said zone signal where said border signal is a distance from said fixed reference point to the border of said selected zone.

19. The system of claim 18 wherein said first means further comprises:

a displacement selection means for selecting one of said first, second, third and fourth displacement signals as said displacement signal as a function of said zone signal generated by said zone detector.

20. The system of claim 19 wherein said third means comprises:

an adder for adding together said border signal and said displacement signal to generate a position signal whose value is said transducer's distance from said fixed reference point recorded on said disk.

21. The system of claim 15 wherein each of said data tracks has a track address TA having a center TAC, expressed in gray scale units, located from said fixed reference point in said gray scale band by the relationship TAC=1.5*TA.

22. A magnetic disk for use in a sector servo disk drive system, said disk having a plurality of sectors located on a surface of said magnetic disk, each sector having Z data tracks located between an inner diameter and an outer diameter on said magnetic disk, a servo band recorded across all said Z data tracks and a gray scale band recorded across all said Z data tracks, said servo band comprising a quadrature servo pattern repeated 0.75*Z times, said gray scale band comprises 1.5*Z consecutively addressed gray scale areas where said servo band and said gray scale band coact to define radial positions on said magnetic disk from a fixed reference point in said gray scale band on the surface of said disk.

23. The magnetic disk of claim 22 wherein said quadrature servo pattern is comprised of a first, second, third and fourth burst where said first burst is initiated at the mid point of a fourth burst of a preceding quadrature servo pattern, said second burst is initiated at a point of termination of said A burst, said third burst is initiated at a mid point of said first burst and said fourth burst is initiated at a point of termination of said third burst and is terminated at a mid point of a first burst of a following quadrature servo pattern.

24. The magnetic disk of claim 23 wherein said gray scale areas are consecutively addressed starting with address zero and said fixed reference point is located at a center of a gray scale area having an address of zero.

25. The magnetic disk of claim 24 wherein:

each data track has a width W;

said first, second, third and fourth servo burst each have a width of $\frac{2}{3}*W$; and each said gray scale area has a width of $\frac{2}{3}*W$.

26. The magnetic disk of claim 25 wherein said gray scale area having address zero is initiated at a point of initiation of said gray scale band and a data track having a data track address of zero.

27. The magnetic disk of claim 25 wherein said gray scale area having address zero is initiated at a point $\frac{1}{6}*W$ from the initiation of said gray scale band and a data track having a data track address of zero.

28. The magnetic disk of claim 22 wherein said quadrature servo pattern is comprised of a first, second, third and fourth burst where said first burst is initiated at a mid point of a third burst of a preceding quadrature servo pattern, said second burst is initiated at a point of termination of said first burst, said fourth burst is initiated at a mid point of said first burst and said third burst is initiated at a point of termination of said fourth burst and is terminated at a mid point of a first burst of a following quadrature servo pattern.

29. The magnetic disk of claim 28 wherein said gray scale areas are consecutively addressed starting with address zero and said fixed reference point is located at a center of a gray scale area having an address of zero.

30. The magnetic disk of claim 29 wherein:

each data track has a width W;

said first, second, third and fourth servo burst each have a width of $\frac{2}{3}*W$; and each said gray scale area has a width of $\frac{2}{3}*W$.

31. The magnetic disk of claim 30 wherein said gray scale area having address zero is initiated at a point of initiation of said gray scale band and a data track having a data track address of zero.

32. The magnetic disk of claim 30 wherein said gray scale area having address zero is initiated at a point $\frac{1}{6}*W$ from the initiation of said gray scale band and a data track having a data track address of zero.

33. A method of generating a radial position signal that is indicative of the position of a transducer from a fixed reference point located on the surface of a disk in a sector servo disk drive system, said method comprising the steps of:

a) recording in each sector on said surface of said disk a servo band across all Z data tracks located on said surface of said disk where said servo band is comprised of 0.75*Z quadrature servo patterns;

b) recording in each sector on said surface of said disk a gray scale band across all said Z data tracks where said gray scale band is comprised of +e,fra 1.5+ee *Z consecutively addressed gray scale areas;

c) reading by said transducer from a sector the magnitude of each of said four servo bursts of a quadrature servo pattern in said servo band and an address of a gray scale area in said gray scale band; and d) generating a position signal indicative of a distance of said transducer from said fixed reference point located in said gray scale band from the magnitude of each of said four servo bursts of a quadrature servo pattern in said servo band and an address of a gray scale area in said gray scale band read by said transducer.

34. The method of claim 33 wherein step a includes the step of:

a1) recording a quadrature servo pattern has four servo burst, a first, second, third and fourth burst, where each said servo burst has a width $\frac{2}{3}*W$, where W is the width of a data track, said recording positioning said four bursts either in a first or second relationship;

said first relationship having said first burst initiated at a mid point of a fourth burst of a preceding quadrature pattern, said second burst initiated at a point of termination of said first burst, said third burst initiated at a mid point of said first burst and said fourth burst initiated at a point of termination of said third burst and terminated at a mid point of a first burst of a following quadrature servo pattern; and said second relationship having first burst initiated at a mid point of a third burst of a preceding quadrature servo pattern, said second burst initiated at a point of termination of said first burst, said fourth burst initiated at a mid point of said first burst and said third burst initiated at a point of termination of said fourth burst and terminated at a mid point of a first burst of a following quadrature servo pattern.

35. The method of claim 34 wherein step b comprises the step of:

b1) recording said gray scale band where each gray scale area has a width of $\frac{2}{3}*W$ and where a gray scale area having address zero is initiated at the same radial location as a data track having a data track address of zero is initiated; and b2) recording consecutive addresses in said gray scale areas starting with address zero where said fixed reference point is located at a center of said gray scale area having address zero.

36. The method of claim 35 wherein step d comprises the steps of;

d1) segmenting each said gray scale area into two zones where a gray scale area having an even address is divided into zone 1 and zone 0 and a gray scale area having an even addressed is divided into zone 2 and zone 3 and a center of each zone is located at a boundary between two of said four servo burst;

d2) generating a displacement signal indicative of said transducer's position from said center of said zone;

d3) generating a center signal indicative of the distance of said zone's center from said fixed reference point; and d4) combining said center signal and said displacement signal to generate a digital signal having a value indicative of said transducer's position from said fixed reference point recorded on said surface of said disk.

37. The method of claim 36 wherein step d2 comprises the steps of:

i) generating from the magnitude of an analog signal for a first, second, third and fourth burst of said quadrature servo pattern read by said transducer a corresponding first, second, third and fourth digital signal; and ii) generating a first displacement signal (Q) by subtracting said second digital signal from said first digital signal, a second displacement (Q') signal by subtracting said first digital signal from said second digital signal, a third displacement (N) signal by subtracting said fourth digital signal from said third digital signal and fourth displacement signal (N') by subtracting said third digital signal from said fourth digital signal.

38. The method of claim 37 wherein step d3 comprises the steps of:
  i) generating a zone signal which selects a selected zone as a function of said values for said first, second and third displacement signals and whether said address of said gray scale area is odd or even;
  ii) generating a center signal as a function of said zone signal where said center signal is a distance from said fixed reference point to the center of said selected zone associated with the gray scale area read by said transducer.

39. The method of claim 38 wherein said step d2 further comprises the step of:
  iii) selecting one of said first, second, third and fourth displacement signals as a displacement signal as a function of said zone signal generated by said zone detector.

40. The method of claim 39 wherein said step d4 comprises the step of:
  i) adding together said center signal and said displacement signal to generate a position signal whose value is the distance of said transducer from said fixed reference point recorded on said disk.

41. The method of claim 35 further comprising the step of:
  e) generating for a data track having an address TA a data track position signal, in gray scale units, indicative of said data track, center TAC from said fixed reference point in said gray scale band in accordance with the relationship TAC=(1.5* TA)+0.25.

42. The method of claim 34 wherein step b comprises the step of:
  b1) recording said gray scale band where each gray scale area has a width of ⅔*W and where a gray scale area having address zero is initiated ⅙*W from the point of initiation of a data track having a data track address of zero; and
  b2) recording consecutive addresses in said gray scale areas starting with address zero where said fixed reference point is located at a center of said gray scale area having address zero.

43. The method of claim 42 wherein step d comprises the steps of;
  d1) segmenting each said gray scale area into four zones where a gray scale area having an even address is divided into zones 1, 2, 3 and 4 and a gray scale area having an odd addressed is divided into zone 5, 6, 7 and 8, where a border of each zone is located at a boundary between two burst of said four burst;
  d2) generating a displacement signal indicative of said transducer's position from said border of said zone;
  d3) generating a border signal indicative of the distance of said zone's border from said fixed reference point; and
  d4) combining said border signal and said displacement signal to generate a digital signal having a value indicative of said transducer's position from said fixed reference point recorded on said surface of said disk.

44. The method of claim 43 wherein step d2 comprises the steps of:
  i) generating from the magnitude of an analog signal for a first, second, third and fourth burst of said quadrature servo pattern read by said transducer a corresponding first, second, third and fourth digital signal; and
  ii) generating a first displacement signal (Q) by subtracting said second digital signal from said first digital signal, a second displacement (Q') signal by subtracting said first digital signal from said second digital signal, a third displacement (N) signal by subtracting said fourth digital signal from said third digital signal and fourth displacement signal (N') by subtracting said third digital signal from said fourth digital signal.

45. The method of claim 44 wherein step d3 comprises the steps of:
  i) generating a zone signal which selects a selected zone as a function of said values for said first, second and third displacement signals and whether said address of said gray scale area is odd or even;
  ii) generating a border signal as a function of said zone signal where said border signal is a distance from said fixed reference point to the border of said selected zone associated with the gray scale area read by said transducer.

46. The method of claim 45 wherein said step d2 further comprises the step of:
  iii) selecting one of said first, second, third and fourth displacement signals as a displacement signal as a function of said zone signal generated by said zone detector.

47. The method of claim 46 wherein said step d4 comprises the step of:
  i) adding together said border signal and said displacement signal to generate a position signal whose value is indicative of the distance of said transducer from said fixed reference point recorded on said disk.

48. The method of claim 42 further comprising the step of:
  e) generating for a data track having an address TA a data track position signal, in gray scale units, indicative of said data track, center TAC from said fixed reference point in said gray scale band in accordance with the relationship TAC=1.5*TA.

* * * * *

UNITED STATES PATENT AND TRADEMARK OFFICE
CERTIFICATE OF CORRECTION

PATENT NO. : 5,600,506
DATED : February 4, 1997
INVENTOR(S) : Michael Baum et al.

It is certified that error appears in the above-indentified patent and that said Letters Patent is hereby corrected as shown below:

Column 1, line 55, "addressed" should be --address--.
Column 1, line 66, delete "invention".
Column 2, line 8, "sequential" should be --sequentially--.
Column 2, line 14, "term" should be --terms--.
Column 2, line 54, "burst" should be --bursts--.
Column 3, line 59, "is" should be --are--.
Column 4, line 4, "characterizes" should be --characterized--.
Column 4, line 15, "pattern" should be --patterns--.
Column 4, line 21, "pattern" should be --patterns--.
Column 4, line 30, "is" should be --are--.
Column 4, line 42, "track" should be --tracks--.
Column 4, line 43, "burst" should be --bursts--.
Column 4, line 44, "track" should be --tracks--.
Column 4, line 45, "burst" should be --bursts--.
Column 4, line 47, "burst" should be --bursts--.
Column 4, line 48, "burst" should be --bursts--.
Column 4, line 50, "burst" should be --bursts--.
Column 4, line 52, "area" should be --areas--.
Column 4, line 54, "abutted" should be --abut--.
Column 4, line 56, "area" should be --areas--.
Column 4, line 61, insert a comma after "assigned".
Column 4, line 61, insert a comma after "order".
Column 4, line 62, "sequential" should be --sequentially--.
Column 5, line 33, after "burst will" insert --be--.
Column 5, line 42, "ever" should be --every--.
Column 5, line 43, "burst" should be --bursts--.
Column 6, line 9, "Zone I" should be --Zone 1--.
Column 6, line 38, "responses" should be --response--.
Column 6, line 59, "detector" should be --detectors--.
Column 7, line 20, "control" should be --controls--.
Column 7, line 55, "bursts" should be --burst--.
Column 8, line 35, "indicates" should be --indicate--.

UNITED STATES PATENT AND TRADEMARK OFFICE
CERTIFICATE OF CORRECTION

Page 2 of 4

PATENT NO. : 5,600,506
DATED : February 4, 1997
INVENTOR(S) : Michael Baum et al.

It is certified that error appears in the above-indentified patent and that said Letters Patent is hereby corrected as shown below:

```
Column 8, line 37,    "derived" should be --derive--.
Column 8, line 52,    after "If N is" insert --greater than Q',
                      then the zone is zone 3.  Since the--.
Column 8, line 59,    "then" should be --than--.
Column 9, line 14,    "then" should be --than--.
Column 9, line 31,    "for" should be --four--. (second occurrence).
Column 9, line 31,    "burst" should be --bursts--.
Column 9, line 33,    "displace" should be --displacement--.
Column 9, line 46,    after "Y" delete "on".
Column 10, line 42,   "patters" should be --patterns--.
Column 11, line 28,   "experience" should be --experienced--.
Column 11, line 34,   after "greater" insert --than--.
Column 11, line 36,   "then" should be --than--.
Column 11, line 51,   "permits" should be --permit--.
Column 11, line 51,   "operation" should be --operations--.
Column 11, line 62,   "inventions" should be --invention--.
Column 12, line 18,   "characterizes" should be --characterized--.
Column 12, line 30,   "pattern" should be --patterns--.
Column 12, line 36,   "pattern," should be --patterns,--.
Column 12, line 50,   "+e,fra 1.5+ee *W" should be --1.5*W--.
Column 12, line 56,   "track" should be --tracks--.
Column 12, line 64,   "w" should be --W--.
Column 13, line 7,    "reflects" should be --reflect--.
Column 13, line 58,   "burst" should be --bursts--.
Column 13, line 60,   "burst" should be --bursts--.
Column 13, line 61,   "ever" should be --every--.
Column 15, line 7,    "bursts" should be --burst--.
Column 16, line 2,    "then" should be --than--.
Column 16, line 29,   "then should be --than--.
```

UNITED STATES PATENT AND TRADEMARK OFFICE
CERTIFICATE OF CORRECTION

PATENT NO. : 5,600,506
DATED : February 4, 1997
INVENTOR(S) : Michael Baum et al.

It is certified that error appears in the above-indentified patent and that said Letters Patent is hereby corrected as shown below:

Column 17, line 10, Servo Pattern V, Zone 2 should be --GS+0+N'--; Servo Pattern VI, Zone 2 should be --GS+0+N--; and Servo Pattern VII, Zone 2 should be --GS+0+Q--.
Column 17, line 29, "for" should be --four--.
Column 17, line 29, "burst" should be --bursts--.
Column 17, line 45, after "Y" delete "on".
Column 17, line 50, "decodes" should be --decode--.
Column 18, line 44, "patters" should be --patterns--.
Column 19, line 27, "of" should be --or--.
Column 19, line 38, "value N. N' Q and Q'" should be --values N, N', Q and Q'--.
Column 19, line 39, "burst" should be --bursts--.
Column 20, line 62, "addressed" should be --address--.
Column 20, line 63, after "and zone" insert --3--.
Column 20, line 64, after "2 and" insert --3--.
Column 20, line 65, "burst" should be --bursts--.
Column 21, line 22, after "from said" delete "first".
Column 21, line 60, "addressed" should be --address--.
Column 23, line 64, "+e,fra 1.5+ee *Z" should be --1.5*Z--.
Column 24, line 11, "al)" should be --al)--.
Column 24, line 12, "burst, a" should be --bursts, a--.
Column 24, line 24, after "having" insert --said--.
Column 24, line 48, "addressed" should be --address--.

UNITED STATES PATENT AND TRADEMARK OFFICE
CERTIFICATE OF CORRECTION

PATENT NO. : 5,600,506
DATED : February 4, 1997
INVENTOR(S) : Michael Baum et al.

It is certified that error appears in the above-indentified patent and that said Letters Patent is hereby corrected as shown below:

```
Column 24, line 50, "burst" should be --bursts--.
Column 25, line 54, "addressed" should be --address--.
Column 25, line 54, "zone" should be --zones--.
Column 25, line 56, "burst" should be --bursts--.
Column 25, line 56, "burst" should be --bursts--.
```

Signed and Sealed this

Sixteenth Day of December, 1997

Attest:

BRUCE LEHMAN

Attesting Officer

Commissioner of Patents and Trademarks